US010726018B2

(12) United States Patent
Chakrabarti et al.

(10) Patent No.: US 10,726,018 B2
(45) Date of Patent: Jul. 28, 2020

(54) SEMANTIC MATCHING AND ANNOTATION OF ATTRIBUTES

(71) Applicant: MICROSOFT TECHNOLOGY LICENSING, LLC, Redmond, WA (US)

(72) Inventors: Kaushik Chakrabarti, Redmond, WA (US); Meihui Zhang, Singapore (SG)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 572 days.

(21) Appl. No.: 14/177,081

(22) Filed: Feb. 10, 2014

(65) Prior Publication Data

US 2015/0227589 A1 Aug. 13, 2015

(51) Int. Cl.
*G06F 16/00* (2019.01)
*G06F 16/2457* (2019.01)
*G06F 16/2455* (2019.01)

(52) U.S. Cl.
CPC .. *G06F 16/24573* (2019.01); *G06F 16/24564* (2019.01)

(58) Field of Classification Search
CPC ......... G06F 17/30525; G06F 17/30507; G06F 16/24564; G06F 16/24573
USPC ....................................................... 707/637
See application file for complete search history.

(56) References Cited

U.S. PATENT DOCUMENTS

| | | | | |
|---|---|---|---|---|
| 7,149,746 B2 * | 12/2006 | Fagin | ................... | G06F 16/258 707/756 |
| 7,246,116 B2 * | 7/2007 | Barsness | ........... | G06F 17/30536 707/714 |
| 7,249,328 B1 * | 7/2007 | Davis | .................... | G06F 17/212 707/999.202 |
| 7,958,489 B2 * | 6/2011 | Meijer | ..................... | G06F 8/71 717/110 |
| 2002/0103793 A1 * | 8/2002 | Koller | ................. | G06F 16/2462 |
| 2003/0012428 A1 * | 1/2003 | Syeda-Mahmood | ....................... | G06F 17/3025 707/723 |

(Continued)

OTHER PUBLICATIONS

Assaf et al., "RUBIX: A Framework for Improving Data Integration with Linked Data", In Proceedings of the First International Workshop on Open Data, May 25, 2012, 9 pages.

(Continued)

*Primary Examiner* — Shew Fen Lin

(57) ABSTRACT

Techniques and constructs to facilitate semantic matching and automated annotation (SMA) of attributes can take entity names and a keyword describing an attribute associated with the named entities as input and leverage a corpus of data such as data from tables, which can include HTML web tables, to automatically populate values associated with the named entities for the attribute. The constructs enable accurate SMA of attributes, such as attributes that relate to the entity and include numeric values in a different unit than the query, in a different scale than the query, and/or reflecting a time different from that of the query. An entity augmentation application programming interface (API) may be used to accept queries that include numeric criteria, parameters, or arguments, including query attributes represented by numeric values, which may be in different units or scales, and attributes represented by numeric values that can vary by time.

10 Claims, 13 Drawing Sheets

(56) References Cited

U.S. PATENT DOCUMENTS

| | | | | |
|---|---|---|---|---|
| 2005/0262051 | A1* | 11/2005 | Dettinger | G06F 16/24573 |
| 2007/0156669 | A1* | 7/2007 | Marchisio | G06F 16/951 |
| 2007/0185868 | A1* | 8/2007 | Roth | G06F 17/30911 |
| 2010/0030801 | A1* | 2/2010 | Takayama | G06F 17/30595 707/802 |
| 2010/0332511 | A1 | 12/2010 | Stockton et al. | |
| 2011/0071965 | A1* | 3/2011 | Long | G06N 20/00 706/12 |
| 2012/0011115 | A1* | 1/2012 | Madhavan | G06F 16/951 707/723 |
| 2012/0254143 | A1 | 10/2012 | Varma et al. | |
| 2013/0238621 | A1* | 9/2013 | Ganjam | G06F 16/2465 707/737 |
| 2014/0059043 | A1* | 2/2014 | Sundara | G06F 17/30 707/723 |

OTHER PUBLICATIONS

Cafarella, et al., "Data Integration for the Relational Web", In Proceedings of the VLDB Endowment, vol. 2, No. 1, Aug. 24, 2009, 12 pages.

Cafarella et al., "Uncovering the Relational Web", In Proceedings of the 11th International Workshop on Web and Databases, Jun. 13, 2008, 6 pages.

Cafarella et al., "Webtables: Exploring the Power of Tables on the Web", In Proceedings of the VLDB Endowment, vol. 1, No. 1, Aug. 2008, 12 pages.

Dhamankar et al., "iMAP: Discovering Complex Semantic Matches Between Database Schemes", In Proceedings of the ACM SIGMOD International Conference on Management of Data, Jun. 13, 2004, 12 pages.

Doan et al., "Semantic Integration Research in the Database Community: A Brief Survey", In Journal, AI Magazine—Special Issue on Semantic Integration, vol. 26, No. 1, Mar. 2005, 10 pages.

"Global 2000 Leading Companies 2011", retrieved on Sep. 13, 2013, at <<http://www.forbes.com/lists/2012/18/global2000_2011.html>>, Forbes, 16 pages.

Johnson, "City Mayors", retrieved on Sep. 19, 2013, at <<http://www.citymayors.com/statistics/largest-cities-mayors-1.html>>, City Mayors & Tann vom Hove, 3 pages.

Kleinberg et al., "Approximation Algorithms for Classification Problems with Pairwise Relationships: Metric Labeling and Markov Random Fields", In the Journal of the ACM, Sep. 2002, 24 pages.

Koller et al., "Probabilistic Graphical Models: Principles and Techniques", In the MIT Press, Aug. 2009, 1265 pages.

Limaye et al., "Annotating and Searching Web Tables Using Entities, Types and Relationships", In Proceedings of the VLDB Endowment, vol. 3, No. 1-2, Sep. 2010, 10 pages.

"List of Countries and Dependencies by Area", retrieved on Sep. 13, 2013, at <<http://en.wikipedia.org/wiki/List_of_countries_and_dependencies_by_area>>, Wikipedia, 20 pages.

Malewicz et al., "Pregel: A System for Large-Scale Graph Processing", In Proceedings of the ACM SIGMOD International Conference on Management of Data, Jun. 6, 2010, 11 pages.

Mulwad et al., "A Domain Independent Framework for Extracting Linked Semantic Data from Tables", In Search Computing, vol. 7538Jul. 2012, 18 pages.

Mulwad et al., "Generating Linked Data by Inferring the Semantics of Tables", In Proceedings of the First International Workshop on Searching and Integrating New Web Data Sources—Very Large Data Search, Sep. 2, 2011, 6 pages.

"OECD Corporate Income Tax Rates, 1981-2012", retrieved on Sep. 13, 2013, at <<http://taxfoundation.org/article/oecd-corporate-income-tax-rates-1981-2012>>, Tax Foundation, Jun. 29, 2012, 3 pages.

Pimplikar et al., "Answering Table Queries on the Web Using Column Keywords", In Proceedings of the VLDB Endowment, vol. 5, No. 10, Jun. 2012, 12 pages.

Quercini et al., "Entity Discovery and Annotation in Tables", In Proceedings of the 16th International Conference on Extending Database Technology, Mar. 18, 2013, 12 pages.

Rahm et al., "A Survey of Approaches to Automatic Schema Matching", In International Journal on Very Large Data Bases, Springer-Verlag, Dec. 2001, pp. 334-350.

Sarma et al., "Finding Related Tables", In Proceedings of the ACM SIGMOD International Conference on Management of Data, May 20, 2012, 12 pages.

Shao et al., "Trinity: A Distributed Graph Engine on a Memory Cloud", In Proceedings of the ACM SIGMOD International Conference on Management of Data, Jun. 22, 2013, 12 pages.

Talukdar et al., "Coupled Temporal Scoping of Relational Facts", In Proceedings of the Fifth ACM International Conference on Web Search and Data Mining, Feb. 8, 2012, 10 pages.

Venetis et al., "Recovering Semantics of Tables on the Web", In Proceedings of the VLDB Endowment, vol. 4, No. 9, Jun. 2011, 11 pages.

Wang et al., "Harvesting Facts from Textual Web Sources by Constrained Label Propagation", In Proceedings of the 20th ACM International Conference on Information and Knowledge Management, Oct. 24, 2011, 10 pages.

Yakout et al., "Infogather: Entity Augmentation and Attribute Discovery by Holistic Matching with Web Tables", In Proceedings of the ACM SIGMOD International Conference on Management of Data, May 20, 2012, 12 pages.

Zhang et al., "Automatic Discovery of Attributes in Relational Databases", In Proceeding of the ACM SIGMOD International Conference on Management of Data, Jun. 12, 2011, 12 pages.

* cited by examiner

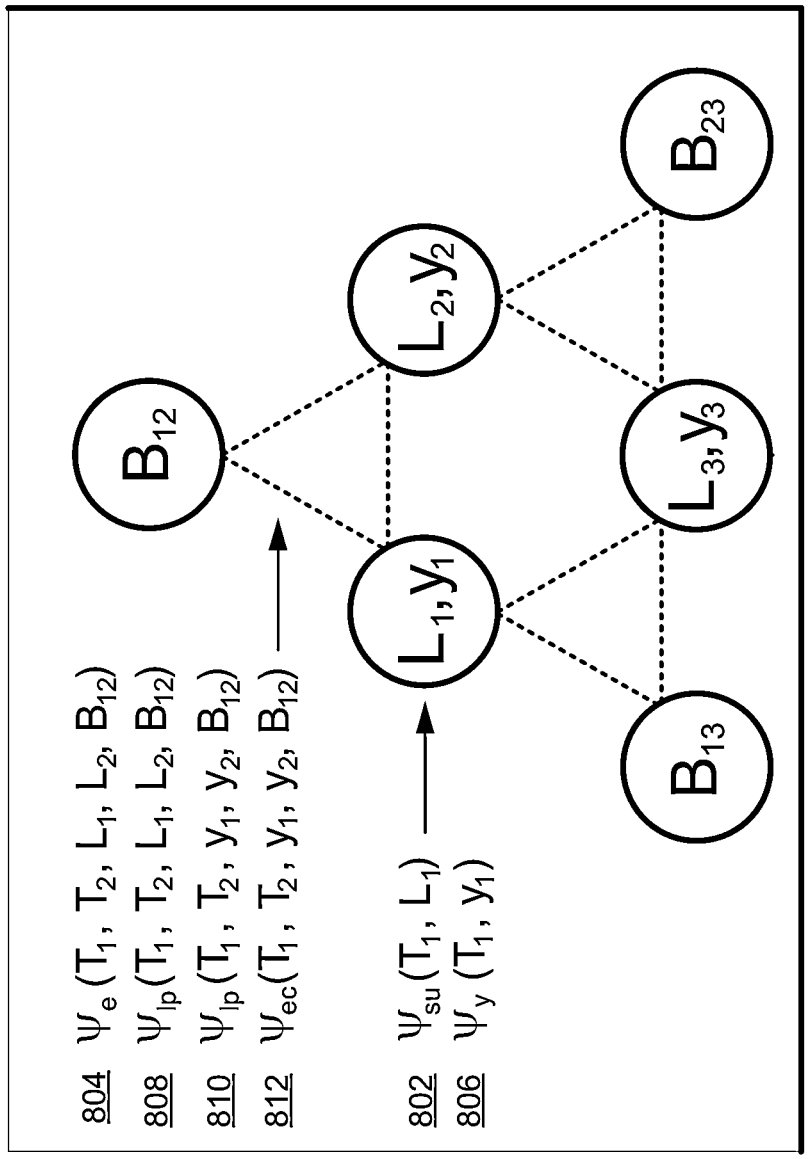

Algorithm 1: Independent Inference

```
1  foreach table T ∈ 𝒯 do
2      Initialization: L_T = {}, y_T = NA
       // local extraction of unit and scale
3      foreach label l ∈ ℒ do
4          if max(f_H(T,l), f_V(T,l)) = 1 then
5              L_T.add(l);

// local extraction of year
6      foreach year y ∈ 𝒴 do
7          if max(f_H(T,y), f_C(T,y)) = 1 then
8              y_T = y;

// S and X edge computation
9  foreach table pair T, T' do
10     B_{TT'} = argmax ψ_e(T, T', L_T, L'_T, B_{TT'});

// Spurious edge elimination
11 foreach table pair T, T' do
12     if ψ_ec(T, T', y_T, y'_T, B_{TT'}) = -∞ then
13         B_{TT'} = NA;

14 return L_T, y_T, B_{TT'};
```

902 — (lines 1–8)
904 — (lines 9–10)
906 — (lines 11–13)

Algorithm 3: Query Processing

// Step 1: Identify matching tables
1  $S = EI(Q)$;
2  $S = S \cap NLI(Q)$;
3  $S = S \cup \bigcup_{T \in S} GI(T)$;
// Step 2: Fill-in values
4  foreach *table* $T \in S$ do
5      foreach *tuple* $t \in T$ do
6          if $t.e \in Q.E$ then
7              $v = \text{Convert}(t.v, L_T, Q.SU)$;
8              $\text{Aggregate}(t.e, v)$;
9  $\text{AugmentEntity}(Q.E)$;

FIG. 12

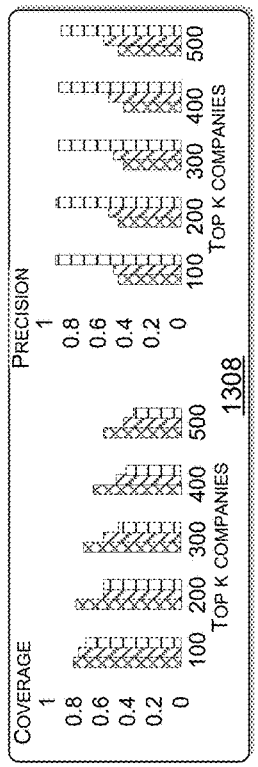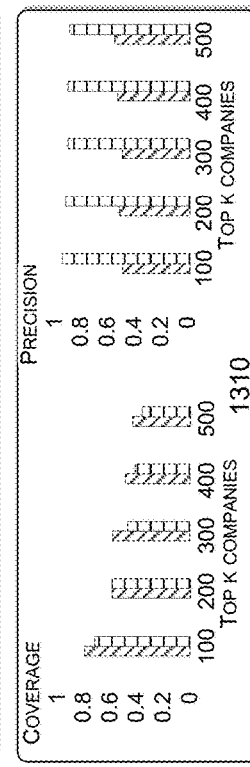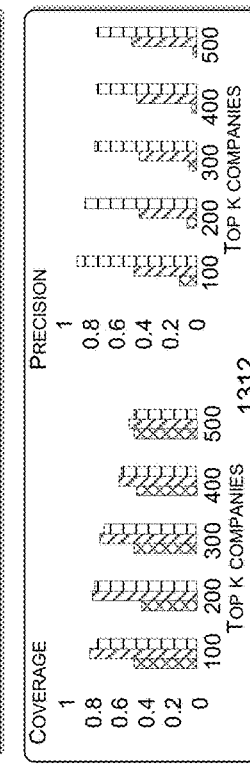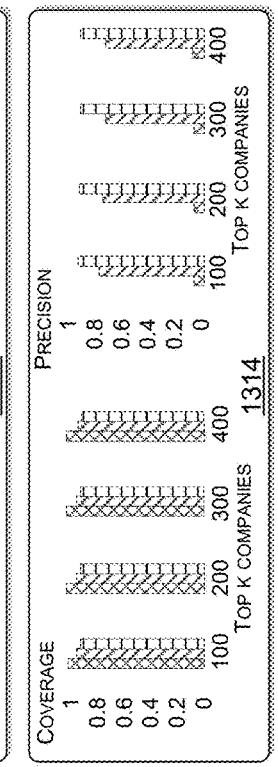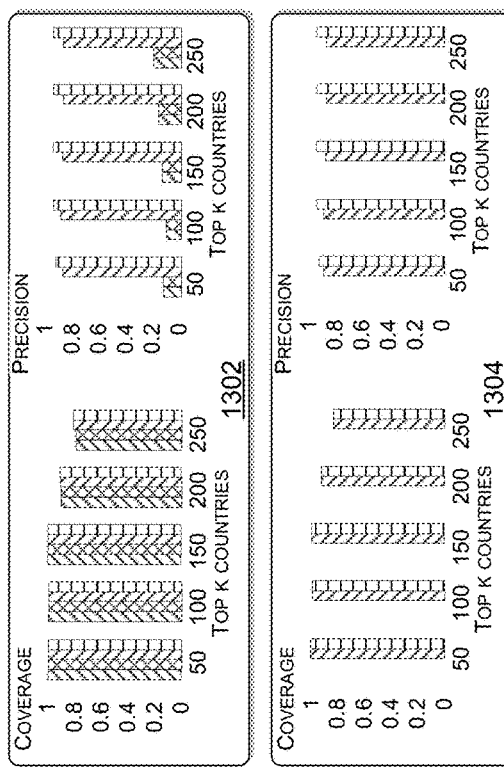
FIG. 13

SEMANTIC MATCHING AND ANNOTATION OF ATTRIBUTES

BACKGROUND

Users often desire to gather information about entities of interest, such as companies, schools, etc. There have been some recent efforts to automate this task by leveraging the vast corpus of hypertext markup language (HTML) tables available via the Internet. Such efforts are often referred to as entity augmentation. Accuracy of entity augmentation depends on semantic relationships between web tables and semantic labels of those tables. Current techniques work well for string-valued, e.g., textual, and static attributes, but current techniques perform poorly for numeric and time-varying attributes. While numeric and/or time-varying information may be available, they are often provided in different units or for different periods of time. Thus, while existing techniques may be well suited to string-values and static attributes, they will often return incorrect information for numeric and/or time-varying attributes. The inaccuracy and need for error correction make information gathering tasks for numeric and time-varying attributes extremely labor-intensive today.

SUMMARY

The techniques and constructs discussed herein facilitate semantic matching and automated annotation (SMA) of attributes including attributes represented by numeric values, which may be in different units or scales, and attributes represented by numeric values that can vary by time. An entity augmentation operation as described herein can take entity names and multiple keywords describing an attribute associated with the entities as input and leverage a corpus of data, such as tables, which can include HTML web tables, to automatically populate values of the named entities for the attribute including when the attribute is represented by a numeric value, which may be in different units or scales, and when the attribute is represented by numeric values that can vary by time.

The constructs discussed herein enable efficient SMA of attributes from tables, including attributes represented by numeric values, which may be in different units or scales, and attributes represented by numeric values that can vary by time. In some embodiments, the constructs discussed herein can be implemented in a semantic matching and annotation framework provided via an application programming interface (API) or as a separate service, program, or system. An entity augmentation application programming interface (API) may be used to accept queries with numeric criteria, parameters, or arguments, including those that vary by time.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 8 depicts an example graphical model to facilitate SMA of attributes from three web tables, according to some embodiments.

FIG. 9 depicts an example algorithm for independent inference employed in SMA of attributes, according to various embodiments.

FIG. 11 depicts an example algorithm for collective inference employed in SMA of attributes, according to various embodiments.

FIG. 12 depicts an example algorithm for query processing employed in SMA of attributes, according to various embodiments.

FIG. 13 illustrates a number of examples of experimental results.

DETAILED DESCRIPTION

Overview

Figure 1:
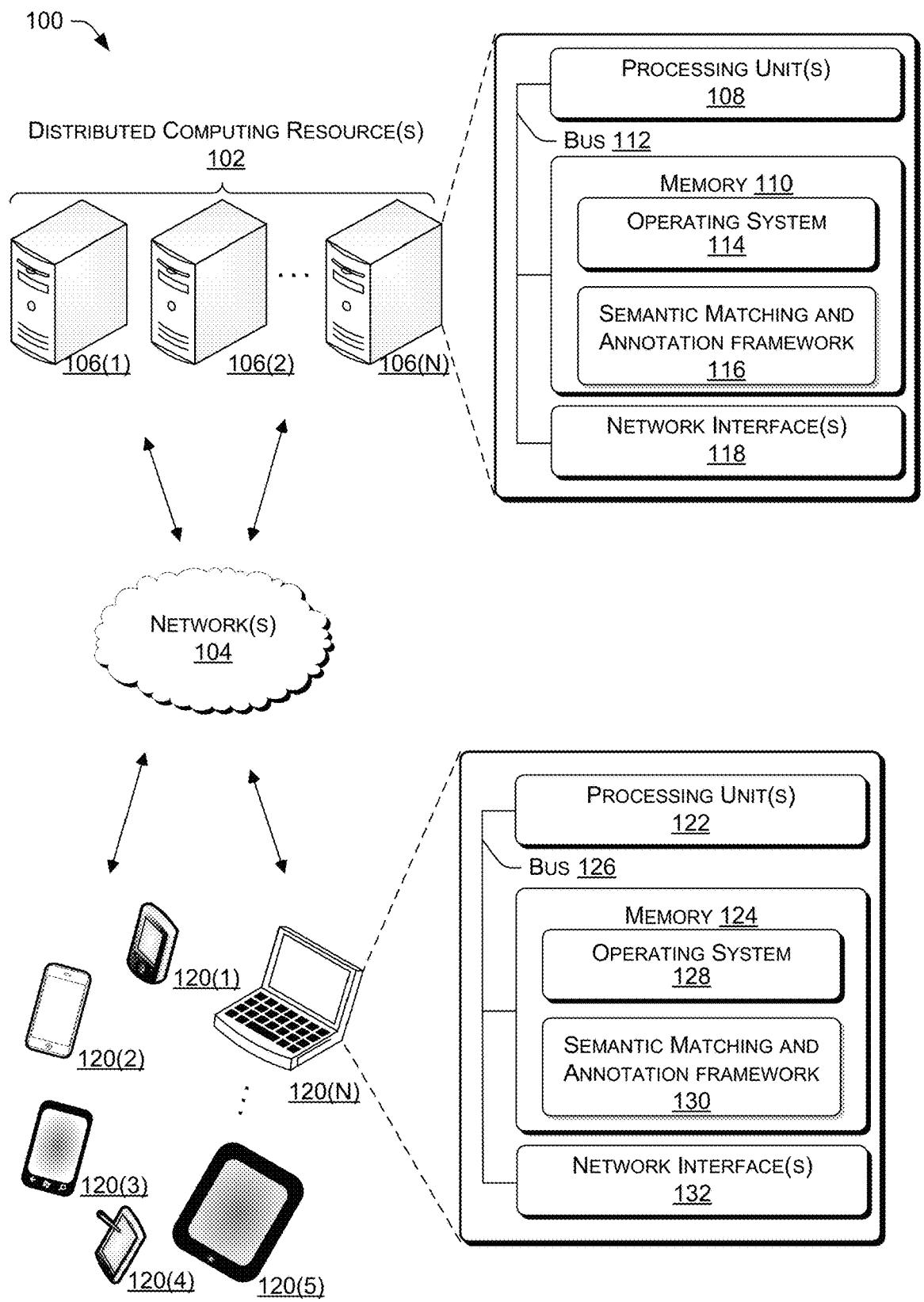
FIG. 1 is a block diagram depicting an example environment in which embodiments of semantic matching and automated annotation (SMA) of attributes can operate.

Embodiments described herein provide techniques and constructs to improve semantic matching and annotation of numeric and time-varying attributes, such as from web tables, using resources including, for example, processing units and accelerators. Such resources may be implemented using specialized programming. For example, resources may have different execution models as is the case for graphics processing units (GPUs) and computer processing unit (CPUs). Resources configured for semantic matching and annotation of attributes, including attributes represented by numeric values, which may be in different units or scales, and attributes represented by numeric values that can vary by time, perform entity augmentation to automate information gathering. Such entity augmentation involves entities and multiple keywords describing an attribute associated with the entities and leverages data including from a corpus of tables, such as web tables, to automatically populate values of the named entities for the attribute.

Accuracy of entity augmentation depends on identifying semantic relationships between tables, such as web tables, and those tables including semantic labels. In this instance semantic relationships include tables related by meaning and semantic labels include the words or language of the labels having meaning.

An entity augmentation operation can take entity names and multiple keywords describing an attribute associated with the entities as input and leverage a corpus of tables, such as web tables, to automatically populate values of the named entities for the attribute. The corpus can include tables in one or more of hypertext markup language (HTML), resource description framework (RDF), web ontology language (OWL), and/or extensible markup language (XML), for example. A semantic graph can be built to facilitate entity augmentation. Accuracy in the semantic graph depends on correctly identifying relationships between tables and meanings of the labels included in the tables. Conventional techniques are inadequate for attributes represented by numeric values, including numeric attributes that can vary by time, because the conventional techniques do not account for tables representing data using varied units, scale, and/or time.

The flexibility of the techniques and constructs described herein enables semantic matching and annotation of attributes, including attributes represented by numeric values, which may be in different units or scales, and attributes represented by numeric values that can vary by time, such as from web tables. The discussed attributes can include various numeric units, various numeric scales, and time-varying attributes. For example, numeric units can include currencies such as US Dollar, Euro, Yen, and/or Yuan; measurements such as metric and imperial, e.g., feet and meters, kilograms and pounds, and Centigrade and Fahrenheit, etc. As another example, varying numeric scales can include differences in order of magnitude (e.g., billions, millions, thousands, etc.; decade, year, quarter, month, day, hour, minute, second, etc.; dollars, cents, etc.; yards, feet, inches, meters, centimeters, millimeters, etc.). Numeric time-varying attributes can include values that change over time or are aggregated by time such as sales per fiscal year; units of production per quarter; costs per month, etc. Semantic matching and automated annotation (SMA) of attributes, including attributes represented by numeric values, which may be in different units or scales, and attributes represented by numeric values that can vary by time, as described herein enhances information gathering tasks involving such attributes by facilitating accurate entity augmentation. In various embodiments, accurate entity augmentation for attributes, including attributes represented by numeric values, which may be in different units or scales, and attributes represented by numeric values that can vary by time, involves building a probabilistic graphical model to leverage semantic relationships between tables and semantic labels of those tables.

One example implementation includes building a semantic graph in which (i) table columns are labeled with unit, scale and timestamp information and (ii) semantic matches between columns are computed, including when the same numeric attribute is expressed in different units or scales in various tables. This example implementation can include developing or using an entity augmentation application programming interface (API) suited for attributes, including attributes represented by numeric values, which may be in different units or scales, and attributes represented by numeric values that can vary by time, which leverages the semantic graph. Building a semantic graph for this example can be challenging since such label information is often missing from the column headers in one or more of the tables. The techniques described herein complement local label extraction from column headers by leveraging a wealth of tables on the web and inferring label information from semantically matching columns of other tables. Examples are presented in greater detail in the description of the following figures.

Techniques for SMA of attributes as described herein can create interdependence between labels and semantic matches which can present a challenge when tables include related data that is presented in differing units, in different scales, or for different periods of time. Techniques as described herein address this challenge by representing the entity augmentation task as a probabilistic graphical model that jointly discovers labels and semantic matches over a number of columns, and in some instances all columns, from tables such as web tables. Example graphical models are presented in greater detail in the description of the following figures.

Experiments employing the techniques described herein on real-life datasets show that (i) a semantic graph created as described herein contains higher quality labels and semantic matches, and (ii) entity augmentation based on a graph so created has significantly higher precision and recall compared to conventional approaches. Example experimental results are presented in greater detail in the description of the following figures.

The examples described herein employ relational HTML tables where each row corresponds to an entity and each column corresponds to an attribute, although the techniques can be adapted for use with other types of tables. In many cases, web-based HTML tables contain the information sought in information-gathering tasks, although the desired information is typically scattered among various tables. To automate information gathering an entity augmentation operation can receive via an interface such as an input interface implemented by an interface module and/or API, for example, entity names and multiple keywords describing an attribute associated with the entities as input. The entity augmentation operation can via one or more modules and/or APIs, for example, leverage a corpus of tables, such as tables, to automatically construct, annotate, infer, graph, etc. to populate values of the named entities for the attribute. The corpus can include tables in one or more of hypertext markup language (HTML), resource description framework (RDF), web ontology language (OWL), and/or extensible markup language (XML), for example.

One conventional technique described for comparison herein is termed a "baseline approach." The baseline approach to compute semantically consistent matches is to attempt to build a semantic matching graph over web tables. In the baseline approach there is an assumption that each web table has a binary relation with the first column corresponding to the entity name and the second column corresponding to an attribute of the entity (referred to as entity-attribute binary (EAB) relations). In the baseline approach each web table can be represented as a node in a graph. In such a graph there is an edge between two nodes if and only if (i) the first columns of the two web tables contain the same type of entities and (ii) the second columns refer to the same attribute of those entities. These edges can be computed using schema matching, sometimes called schema mapping. There are three main types of schema matching has. The first is semantic schema matching that uses information provided only by the schema and not from particular data instances. The second is syntactic schema matching that uses the actual data instances. The third uses external information, like thesauri, standard schemas, and past mappings. Most current schema matching solutions use hybrid approaches that include all three.

In contrast to the baseline approach and other previous approaches, the techniques and constructs discussed herein are designed to be implemented and executed to perform efficient entity augmentation for attributes, including attributes represented by numeric values, which may be in different units or scales, and attributes represented by numeric values that can vary by time, by leveraging tables.

Embodiments described herein provide techniques and constructs applicable to solve problems encountered in SMA of attributes, including attributes represented by numeric values, which may be in different units or scales, and attributes represented by numeric values that can vary by time. In various instances, a processing unit configured via programming from modules or APIs to perform techniques as described herein can include one or more of a GPU, a field-programmable gate array (FPGA), another class of digital signal processor (DSP), or other hardware logic components that may, in some instances, be driven by the CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

Various embodiments, scenarios, and aspects are described further with reference to FIGS. 1-13.

Illustrative Environment

FIG. 1 shows an example environment 100 in which embodiments of SMA of attributes, including attributes represented by numeric values, which may be in different units or scales, and attributes represented by numeric values that can vary by time can operate. In some embodiments, the various devices and/or components of environment 100 include distributed computing resources 102 that can communicate with one another and with external devices via one or more networks 104.

For example, network(s) 104 can include public networks such as the Internet, private networks such as an institutional and/or personal intranet, or some combination of private and public networks. Network(s) 104 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 104 can utilize communications protocols, including packet-based and/or datagram-based protocols such as internet protocol (IP), transmission control protocol (TCP), user datagram protocol (UDP), or other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

In some embodiments, network(s) 104 can further include devices that enable connection to a wireless network, such as a wireless access point (WAP). Example embodiments support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various embodiments, distributed computing resources 102 include devices 106(1)-106(N). Embodiments support scenarios where device(s) 106 can include one or more computing devices that operate in a cluster or other grouped configuration to share resources, balance load, increase performance, provide fail-over support or redundancy, or for other purposes. Device(s) 106 can belong to a variety of categories or classes of devices such as traditional server-type devices, desktop computer-type devices, mobile devices, special purpose-type devices, embedded-type devices, and/or wearable-type devices. Thus, although illustrated as desktop computers, device(s) 106 can include a diverse variety of device types and are not limited to a particular type of device. Device(s) 106 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

Device(s) 106 can include any type of computing device having one or more processing unit(s) 108 operably connected to memory 110 such as via a bus 112, which in some instances can include one or more of a system bus, a data bus, an address bus, a PCI bus, a Mini-PCI bus, and any variety of local, peripheral, and/or independent buses. Executable instructions stored on memory 110 can include, for example, an operating system 114, a semantic matching and annotation framework 116, and other modules, programs, or applications that are loadable and executable by processing units(s) 108. Alternatively, or in addition, the functionally described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZYLEX or ALTERA that includes a CPU course embedded in an FPGA fabric.

Device 106 can also include one or more network interfaces 118 to enable communications between computing device 106 and other networked devices such as client computing device(s) 120 involved in SMA of attributes, including attributes represented by numeric values, which may be in different units or scales, and attributes represented by numeric values that can vary by time, or other device(s) 106 over network(s) 104. Such network interface(s) 118 can include one or more network interface controllers (NICs) or other types of transceiver devices to send and receive communications over a network. For simplicity, other components are omitted from the illustrated device 106.

Other devices involved in SMA of attributes, including attributes represented by numeric values, which may be in different units or scales, and attributes represented by numeric values that can vary by time, can include client computing devices 120(1)-120(N). Device(s) 120 can belong to a variety of categories or classes of devices such as traditional client-type devices, desktop computer-type devices, mobile devices, special purpose-type devices, embedded-type devices, and/or wearable-type devices. Thus, although illustrated as mobile computing devices, which may have less computing resources than device(s) 106, client computing device(s) 120 can include a diverse variety of device types and are not limited to any particular type of device. Client computing device(s) 120 can include, but are not limited to, computer navigation type client computing devices 120(1) such as satellite-based navigation systems including global positioning system (GPS) devices and other satellite-based navigation system devices, telecommunication devices such as mobile phone 120(2) mobile phone tablet hybrid 120(3), personal data assistants (PDAs) 120(4), tablet computers 120(5), laptop computers such as 120(N), other mobile computers, wearable computers, implanted computing devices, desktop computers, personal computers, automotive computers, network-enabled televisions, thin clients, terminals, game consoles, gaming devices, work stations, media players, personal video recorders (PVR5), set-top boxes, cameras, integrated components for inclusion in a computing device, appliances, or any other sort of computing device.

Client computing device(s) 120 can represent any type of computing device having one or more processing unit(s) 122 operably connected to memory 124 such as via a bus 126, which in some instances can include one or more of a system bus, a data bus, an address bus, a PCI bus, a Mini-PCI bus, and any variety of local, peripheral, and/or independent buses.

Executable instructions stored on memory 124 can include, for example, an operating system 128, a semantic matching and annotation framework 130, and other modules, programs, or applications that are loadable and executable by processing units(s) 122. Alternatively, or in addition, the functionally described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZYLEX or ALTERA that includes a CPU course embedded in an FPGA fabric.

Client computing device 120 can also include one or more network interfaces 132 to enable communications between client computing device 120 and other networked devices such as other client computing device(s) 120 or devices 106 over network(s) 104. Such network interface(s) 132 can include one or more network interface controllers (NICs) or other types of transceiver devices to send and receive communications over a network.

Figure 2:
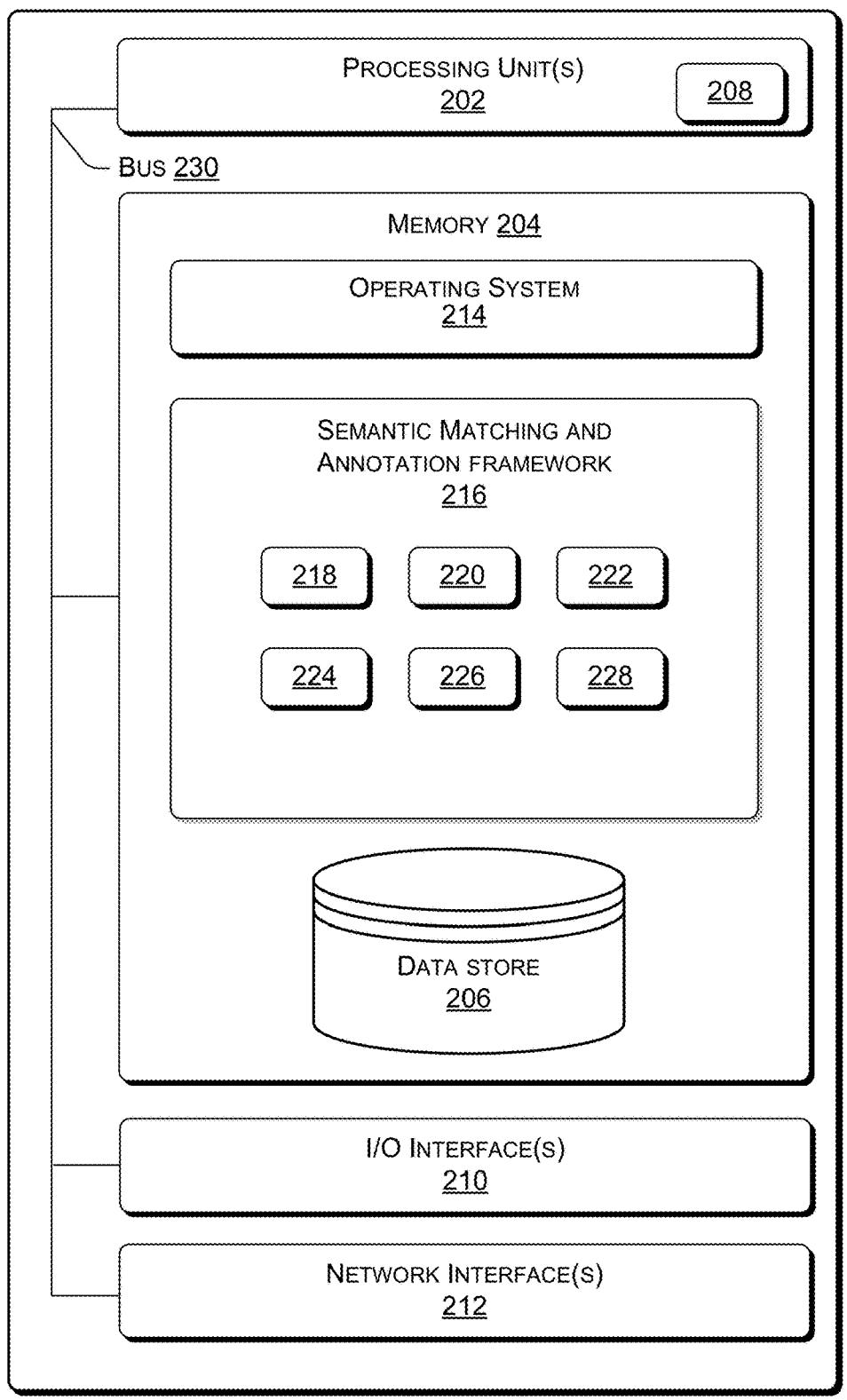
FIG. 2 is a block diagram depicting an example computing device of a distributed computing resource.

FIG. 2 is a block diagram depicting an example computing device 200 of a distributed computing resource, such as a device 106 from FIG. 1. In device(s) 200, processing unit(s) 202, can be processing unit(s) 108 and can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

In some embodiments, memory 204 can be memory 110 and can store instructions executable by the processing unit(s) 202, which as discussed above, can represent a processing unit incorporated in device 200. Memory 204 can also store instructions executable by external processing units such as by an external CPU, an external GPU, and/or executable by an external accelerator, such as an FPGA type accelerator, a DSP type accelerator, or any other internal or external accelerator. In various embodiments at least one CPU, GPU, and/or accelerator is incorporated in device 200, while in some embodiments one or more of a CPU, GPU, and/or accelerator is external to device 200.

In the illustrated embodiment, memory 204 also includes a data store 206. In some embodiments, data store 206 includes data storage such as a database, data warehouse, or other type of structured or unstructured data storage. In some embodiments, data store 206 includes a corpus and/or a relational database with one or more tables, indices, stored procedures, and so forth to enable data access such as web tables including one or more of hypertext markup language (HTML) tables, resource description framework (RDF) tables, web ontology language (OWL) tables, and/or extensible markup language (XML) tables, for example. Data store 202 can store data for the operations of processes, applications, components, and/or modules stored in memory 204 and/or executed by processing unit(s) and/or accelerator(s) 202. Alternately, some or all of the above-referenced data can be stored on separate memories 208 on board one or more processing unit(s) 202 such as a memory on board a CPU-type processor, a GPU-type processor, an FPGA-type accelerator, a DSP-type accelerator, and/or another accelerator.

Device(s) 200 can further include one or more input/output (I/O) interfaces 210 to allow device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). In addition, in device(s) 200, network interface(s) 212, which can be network interface(s) 118, can represent, for example, network interface controllers (NICs) or other types of transceiver devices to send and receive communications over a network.

In the illustrated embodiment, memory 204 also includes an operating system 214, which can be operating system 114. Memory 204 also includes a semantic matching and annotation framework 216, which can be semantic matching and annotation framework 116. Semantic matching and annotation framework 216 can include one or more modules and/or APIs, which are illustrated as blocks 218, 220, 222, 224, 226, and 228, although this is just an example, and the number can vary higher or lower.

Functionality described associated with blocks 218, 220, 222, 224, 226, and 228 can be combined to be performed by a fewer number of modules and/or APIs or it can be split and performed by a larger number of modules and/or APIs. For example, block 218 can represent an extraction module with logic to program processing unit 202 of device 200 for extraction of one or more tables, such as tables from web pages. In some embodiments, the extraction module further includes logic to distinguish between relational tables and at least one other type of table.

Block 220 can represent a construction module with logic to program processing unit 202 for constructing a semantic match between at least two of a plurality of tables including attributes represented by numeric values, which may be in different units or scales, and attributes represented by numeric values that can vary by time.

Block 222 can represent an annotation module with logic to program processing unit 202 of device 200 for annotating columns of one or more of the at least two of the plurality of tables with unit, scale, and/or time information corresponding to the values of numeric attributes, which may be in different units or scales, and can vary by time. In various embodiments block 222 represents logic for performance of such annotation including when label information is missing from column headers in the one or more of the at least two of the plurality of tables.

Block 224 can represent an inference module with logic to program processing unit 202 of device 200 for inferring label information from another of the at least two of the plurality of tables including attributes represented by numeric values, which may be in different units or scales, and attributes represented by numeric values that can vary by time.

Block 226 can represent a graphing module with logic to program processing unit 202 of device 200 for building and/or using a probabilistic graphical model to model label discovery and match discovery.

Block 228 can represent an indexing module with logic to program processing unit 202 of device 200 for building and/or using indexes on the plurality of tables.

Bus 230, which can be bus 112, and which in some instances can include one or more of a system bus, a data bus, an address bus, a PCI bus, a Mini-PCI bus, and any variety of local, peripheral, and/or independent buses, can operably connect memory 204 to processing unit(s) 202.

Figure 3:
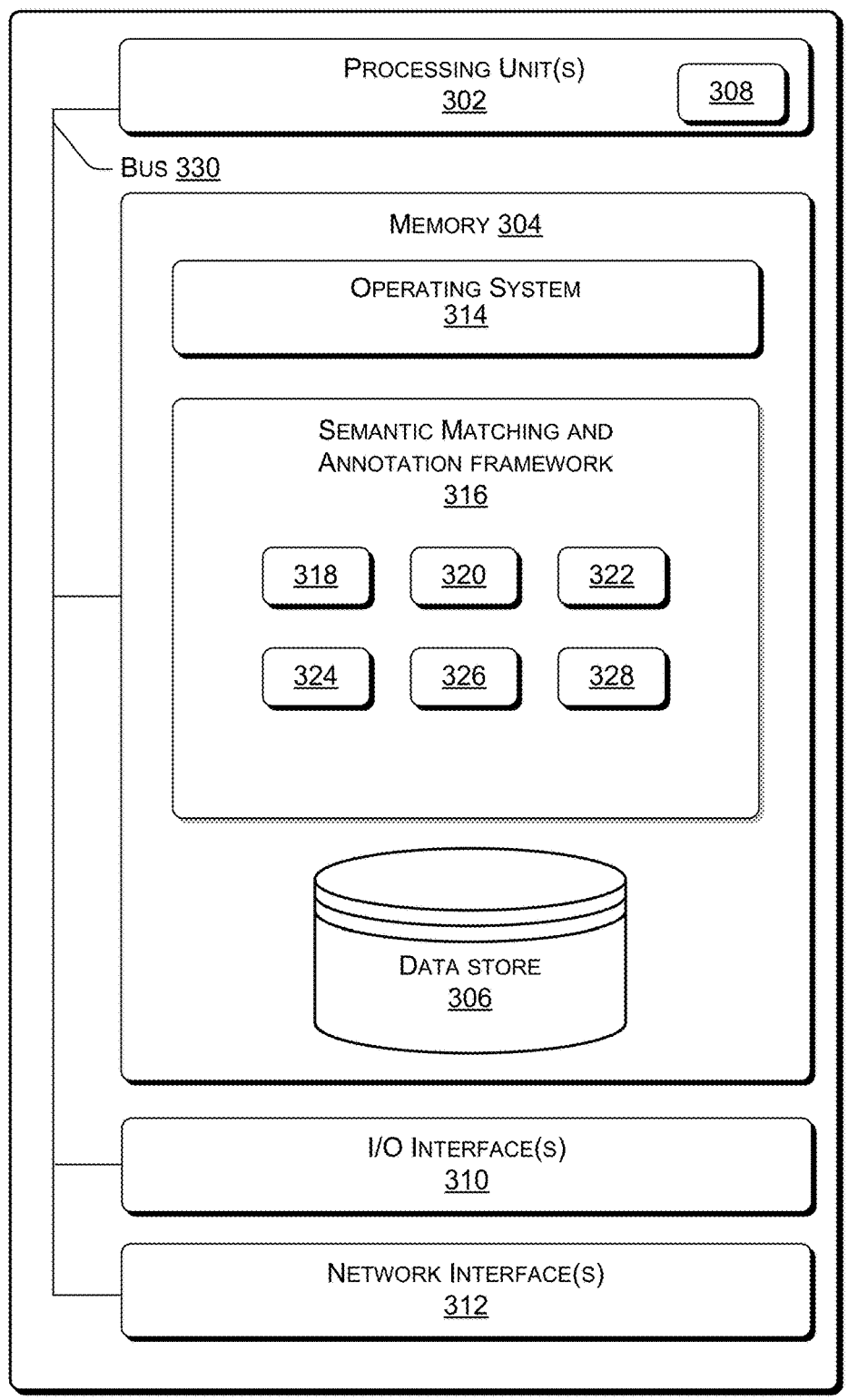
FIG. 3 is a block diagram depicting an example client computing device.

FIG. 3 is a block diagram depicting an example client computing device 300, such as a client device 120 from FIG. 1. In device(s) 300, processing unit(s) 302 can be processing unit(s) 122 and can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

In some embodiments, memory 304 can be memory 124 and can store instructions executable by the processing unit(s) 302, which as discussed above, represents a processing unit incorporated in device 300. Memory 304 can also store instructions executable by external processing units such as by an external CPU, an external GPU, and/or executable by an external accelerator, such as an FPGA type accelerator, a DSP type accelerator, or any other internal or external accelerator. In various embodiments at least one CPU, GPU, and/or accelerator is incorporated in device 300, while in some embodiments one or more of a CPU, GPU, and/or accelerator is external to device 300.

In the illustrated embodiment, memory 304 also includes a data store 306. In some embodiments, data store 306 includes data storage such as a database, data warehouse, or other type of structured or unstructured data storage. In some embodiments, data store 306 includes a relational database with one or more tables, indices, stored procedures, and so forth to enable data access such as web tables including one or more of hypertext markup language (HTML) tables, resource description framework (RDF) tables, web ontology language (OWL) tables, and/or extensible markup language (XML) tables, for example. Data store 306 can store data for the operations of processes, applications, components, and/or modules stored in memory 304 and/or executed by processing unit(s) and/or accelerator(s) 302. Alternately, some or all of the above-referenced data can be stored on separate memories on board one or more processing unit(s) 302 such as a memory 308 on board a CPU-type processor, a GPU-type processor, an FPGA-type accelerator, a DSP-type accelerator, and/or another accelerator. Device(s) 300 can further include one or more input/output (I/O) interfaces 310 to allow device 300 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). In addition, in device(s) 300, network interface(s) 312, which can be network interface(s) 132, can represent, for example, network interface controllers (NICs) or other types of transceiver devices to send and receive communications over a network.

In the illustrated embodiment, memory 304 also includes an operating system 314, which can be operating system 128. Memory 304 also includes a semantic matching and annotation framework 316, which can be semantic matching and annotation framework 130. Semantic matching and annotation framework 316 can include one or more modules and/or APIs, which are illustrated as blocks 318, 320, 322, 324, 326, and 328, although this is just an example, and the number can vary higher or lower.

Functionality described associated with blocks 318, 320, 322, 324, 326, and 328 can be combined to be performed by a fewer number of modules and/or APIs or it can be split and performed by a larger number of modules and/or APIs. For example, block 318 can represent an interface module with logic to program processing unit 302 of device 300 for receiving an entity augmentation query. In some embodiments, the entity augmentation query can include a name of an entity, a keyword associated with the entity, time information associated with the keyword, and at least one of unit information associated with the keyword or scale information associated with the keyword.

Block 320 can represent an identification module with logic to program processing unit 302 for identifying a name of an entity, a keyword associated with the entity, time information associated with the keyword, and at least one of unit information associated with the keyword or scale information associated with the keyword from the entity augmentation query.

Block 322 can represent an annotation module with logic to program processing unit 302 of device 300 for annotating columns of one or more of the at least two of the plurality of tables with unit, scale, and/or time information corresponding to the values of numeric attributes, which may be in different units or scales, and can vary by time. In various embodiments block 222 represents logic for performance of such annotation including when label information is missing from column headers in the one or more of the at least two of the plurality of tables.

Block 324 can represent a conversion module with logic to program processing unit 302 of device 300 for processing the entity augmentation query based at least in part on existing conversion rules or graphs. In various embodiments block 324 represents logic that enables the logic of block 322 to perform annotation including when label information is missing from column headers in the one or more of the at least two of the plurality of tables.

Block 326 can represent a display module with logic to program processing unit 302 of device 300 for presenting results of the entity augmentation query on a display associated with device 300. In various embodiments block 326 represents logic that optimizes for presentation the results according to a size and/or type of display and/or according to a program for which the results are obtained. For example, the logic of block 326 can optimize the results for presentation on a relatively small screen of a mobile device in accordance with the size and resolution of the display. As an added example, the logic of block 326 can expose results of the entity augmentation query to a spreadsheet program for a tabular presentation, a graphical presentation, and/or a chart-type presentation.

Block 328 can represent a communication module with logic to program processing unit 302 of device 300 for sending or making available the entity augmentation query, or such query having undergone some processing as intermediate stage query toward or for one or more devices 200 and/or for receiving entity augmentation results from one or more devices 200. For example, block 328 can send a query toward one or more indexes on device 200, or expose the same for access via an API. As an added example, block 328 can receive results such as an augmented table from one or more devices 200.

Bus 330, which can be bus 126, and which in some instances can include one or more of a system bus, a data bus, an address bus, a PCI bus, a Mini-PCI bus, and any variety of local, peripheral, and/or independent buses, can operably connect memory 304 to processing unit(s) 302.

In some embodiments, one or more of the modules and logic associated with device 200 may operate on device 300 and/or one or more of the modules and logic associated with device 300 may operate on device 200. The modules and logic can be stored on, operated from, or installed from computer-readable media associated with device 200 and/or device 300.

Computer-readable media may include computer storage media and/or communication media. Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Memories 110, 204, 208, 124, 308, and/or 304 are examples of computer storage media. Thus, the memory 110, 204, 208, 124, 308, and/or 304 includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media may embody computer readable instructions, data structures, program modules, or other data in a modulated data signal, such as a carrier wave, or other transmission mechanism. As defined herein, computer storage media does not include communication media. That is, memory 110, 204, 208, 124, 308, and/or 304, and the described computer storage media encompassed thereby does not include communications media consisting solely of a modulated data signal, a carrier wave, or a propagated signal, per se.

Figure 4:
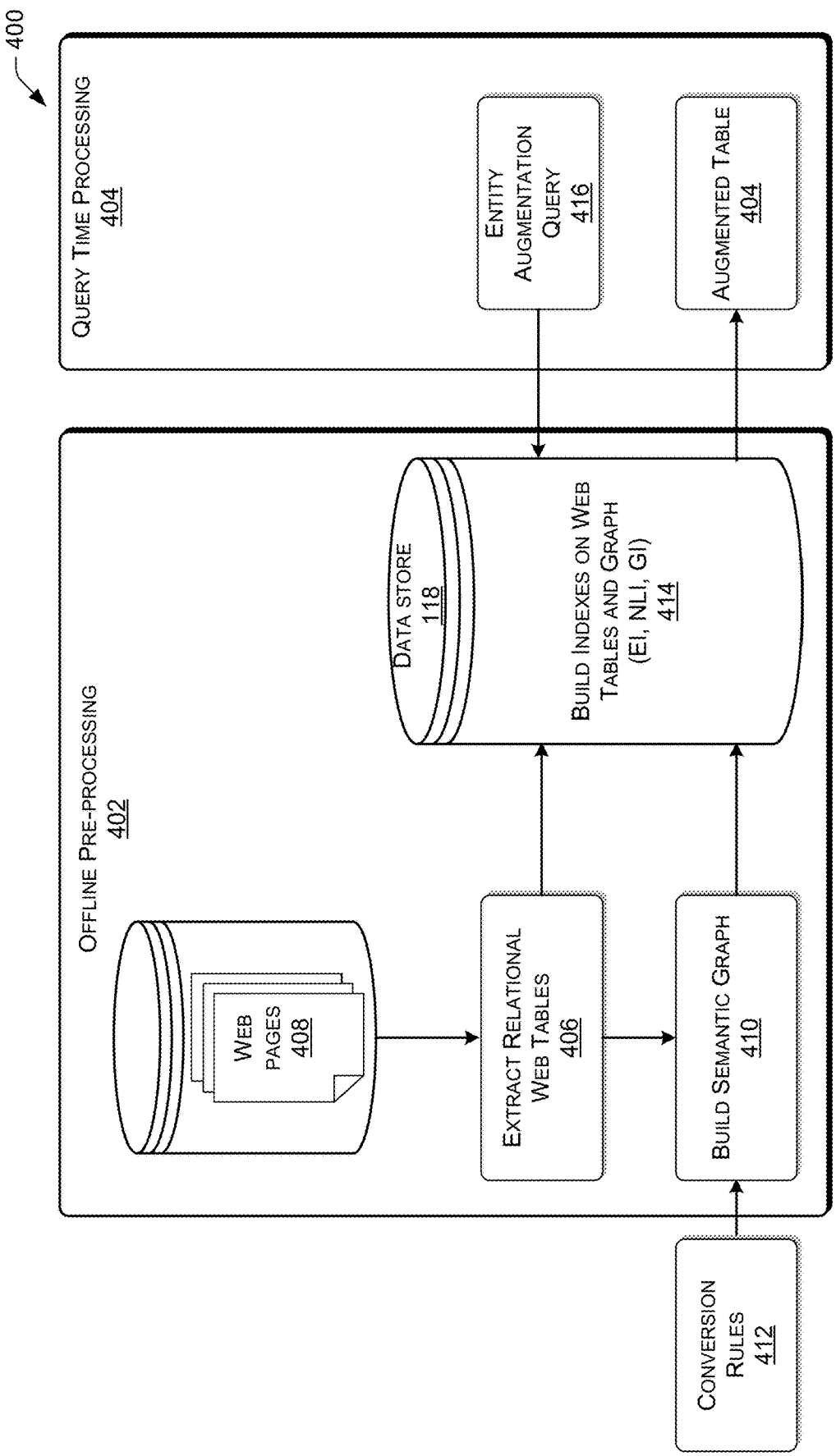
FIG. 4 is a block diagram depicting an example process architecture that can perform SMA of attributes, according to various embodiments.

FIG. 4 is a block diagram depicting an example architecture of processes that semantic matching and annotation framework 216 and/or semantic matching and annotation framework 316 can perform to facilitate SMA of attributes, including attributes represented by numeric values, which may be in different units or scales, and attributes represented by numeric values that can vary by time as described herein. The architecture 400 includes an offline pre-processing portion 402 and a query-time processing portion 404. In some embodiments semantic matching and annotation framework 116 of device(s) 106 and/or semantic matching and annotation framework 216 of device(s) 200 can perform offline pre-processing portion 402 and semantic matching and annotation framework 130 of device(s) 120 and/or semantic matching and annotation framework 316 of device(s) 300 can perform query time processing 404.

In offline pre-processing 402, as illustrated at 406, one or a number of computing devices extract tables from the web. In at least one embodiment computing device(s) 106 extract relational web tables in HTML format from web pages 408 via web crawling. In such embodiments, as part of extraction, the computing device(s) 106 distinguish relational tables from other types of tables such as layout tables and attribute-value tables to avoid expending further processing on non-relational tables. In some embodiments, alternate processing can be performed on non-relational tables and/or other data structures. In one example implementation, the computing device(s) 106 can employ an approach similar to that described in "Uncovering the Relational Web," Cafarella et al., *Proceedings of the 11$^{th}$ International Workshop on Web and Databases*, Jun. 13, 2008, Vancouver Canada, which is incorporated herein by reference.

Also in offline pre-processing, one or a number of computer systems such as computing device(s) 200 or 106 build a semantic graph 410. As will be discussed in greater detail below regarding FIG. 5, the offline pre-processing part of the system receives conversion rules 412, which are applied in building the semantic graph 410.

Also in offline pre-processing, one or a number of computing device(s) such as device(s) 200 or 106 build indexes on the tables and the graph for efficient query time processing 414, which can be stored in a data store or distributed for storage among one or more data stores such as a data store 206 or a data store 306. As will be discussed in greater detail below, in at least one implementation the offline pre-processing part of the system builds indexes. In some instances, the offline pre-processing part of the system can build three indexes: (i) An inverted index on entities EI. Given a query table Q, EI(Q) returns the set of tables (along with scores) that contains at least one of the query entities. (ii) An inverted index on column names and semantic labels NLI: Given a query table Q, NLI(Q) returns the set of tables (along with scores) whose column headers contain the query keywords and/or the set whose semantic labels match with the query labels. (iii) An index on graph edges GI: Given a web table T, GI(T) returns the set of tables that are connected to T in the semantic graph along with a score indicating the strength of the matching relationship.

As offline processing needs to scale to hundreds of millions of tables, extracting tables, such as HTML tables, and building indexes on the tables and the graph are parallelizable (e.g., using a framework such as MAPREDUCE, DryadLINQ, NAIAD, PTask, etc.). Implementing building of a semantic graph 410 for scalability will be discussed in greater detail below with regard to FIG. 8.

Query time processing 404 can be employed for a variety of types of queries. Although examples herein focus on entity augmentation, other appropriate classes of queries include augmentation by example, attribute discovery, and search by column keywords using architecture 400.

In query time processing 404, as illustrated at 416, one or a number of computer computing device(s) such as device(s) 106, device(s) 200, device(s) 120, and/or device(s) 300 identify matching tables and edges along with their scores for the query. In at least one implementation the computing device(s) identify matching tables and edges along with their scores by leveraging the EI, NLI, and GI indexes from offline pre-processing to fill in values. For example, for individual ones of the query entities, in some cases for each query entity, the system collects the corresponding values in these matching tables along with the scores, converts to the desired unit and scale, aggregates the scores for each value and selects the one with the highest aggregate score to form an augmented table 418.

Figure 7:
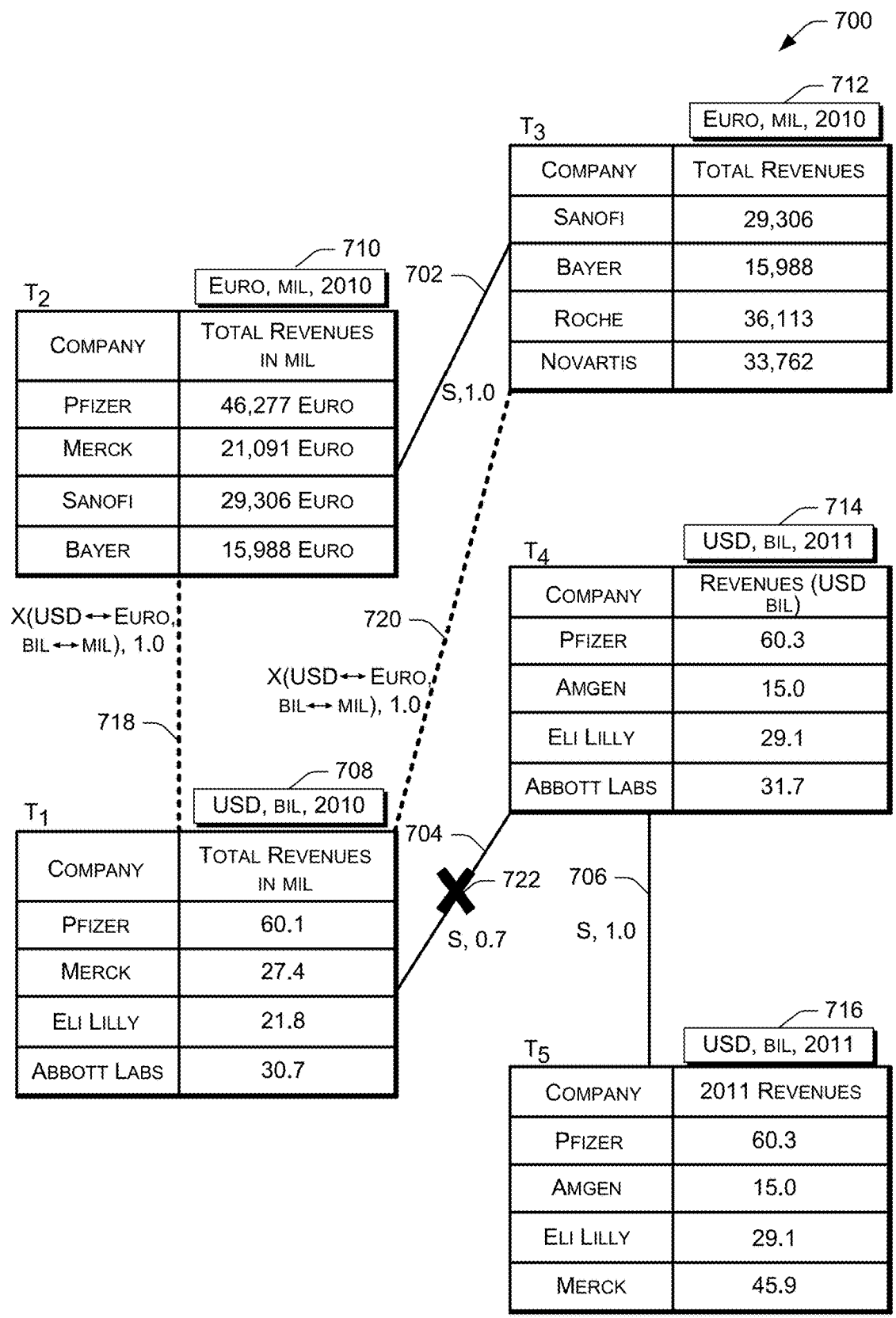
FIG. 7 depicts an example semantic graph over web tables, according to the example scenario of FIG. 6.

In at least one embodiment, a table represents an entity-attribute binary (EAB) relation. In other words, a table $T \in T$ is of the form T(K,B) where K denotes an entity name and B denotes an attribute of the entity. For example, FIG. 7, discussed below, shows five web tables ($T_1$, $T_2$, $T_3$, $T_4$, $T_5$) satisfying the EAB property. Table T has (i) a column header $H_T$ of the attribute column T.B (e.g., $H_{T1}$ for table $T_1$ in FIG. 7 is "2010 Revenues (USD bil)"). $H_T$ can be empty if the table has no column headers. Table T has (ii) context information $C_T$ including header rows that describes the table (that spans across all the columns), caption of the table, text surrounding the table, and the uniform resource locator (URL) and title of the web page from which the table was extracted. In various embodiments, techniques for SMA of attributes, including attributes represented by numeric values, which may be in different units or scales, and attributes represented by numeric values that can vary by time, as described herein distinguish between the different context fields. For simplicity, descriptions of these distinctions are omitted herein.

In practice, not all tables or even all web tables are EAB relations. Most such tables have a "subject column," which contains the names of the entities, and the other columns contain attributes of these entities. Furthermore, there are effective heuristics to detect the subject column. In one example implementation, techniques for SMA of attributes, including attributes represented by numeric values, which may be in different units or scales, and attributes represented by numeric values that can vary by time as described herein can employ an approach similar to that described in "Recovering Semantics of Tables on the Web," Ventetis et al., *PVLDB*, 4(9):528-538, 2011, which is incorporated herein by reference. In several embodiments, the techniques described herein include splitting the n-ary table into (n–1) EAB relations: each of the so constructed EAB relations including the subject column with one of the other (n–1) columns.

Figure 5:
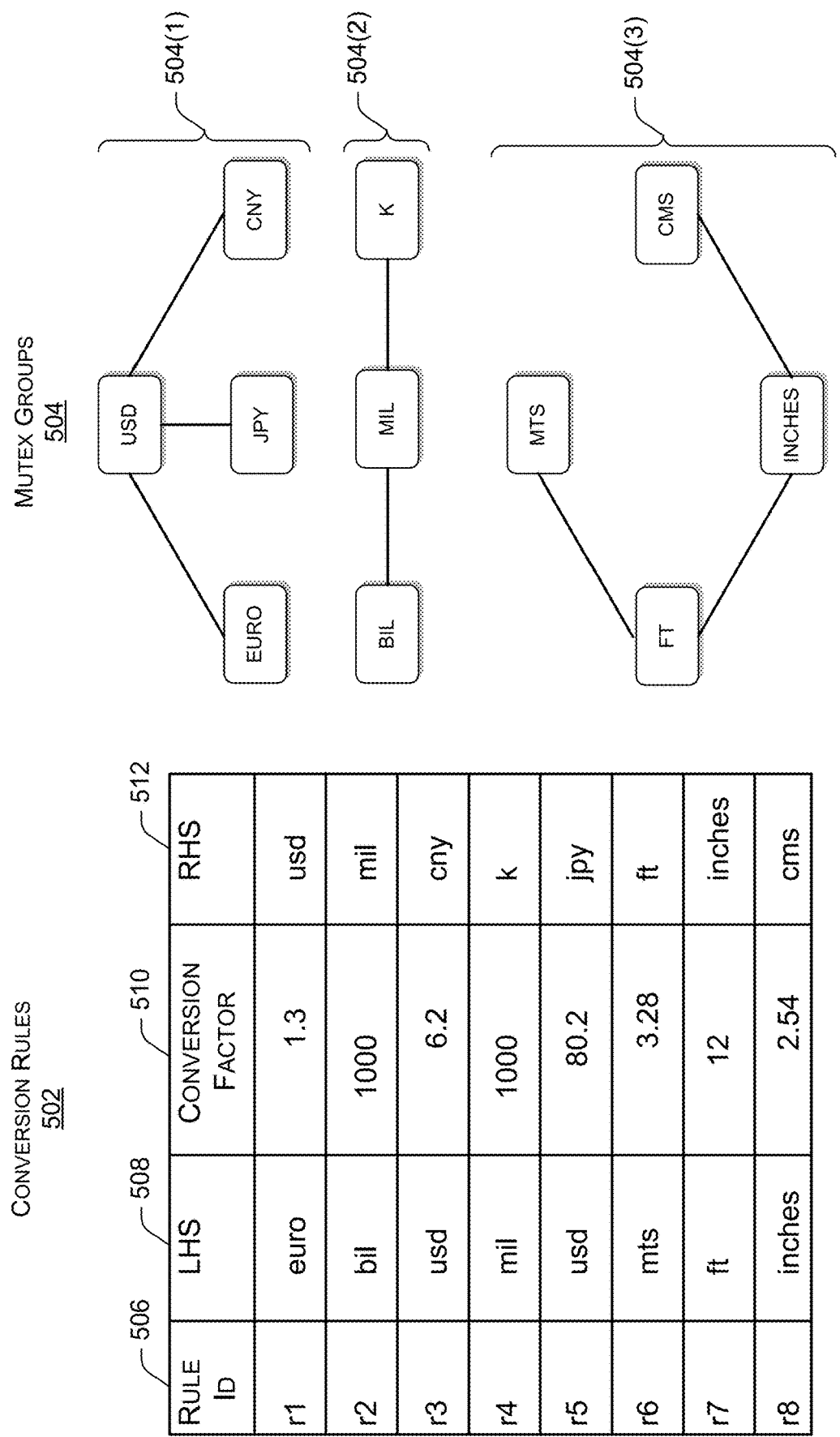
FIG. 5 depicts example conversion rules and mutex groups used to perform SMA of attributes, according to some embodiments.

FIG. 5 depicts a set of example conversion rules 502 and mutually exclusive groups (referred to as "mutex groups") 504 used to perform SMA of attributes, including attributes represented by numeric values, which may be in different units or scales, and attributes represented by numeric values that can vary by time in tables, according to some embodiments. The techniques described herein define a set of mutex groups such that any table can be assigned at most one label from a mutex group.

In various embodiments discussed herein, a set of conversion rules 502 are known at the time of pre-processing. For example, conversion rules can be specified by a system administrator or one or more domain experts. In various examples the rules can be expressed using a simple rule specification language. In the illustrated embodiment a set of eight rules is shown. In the illustrated set of rules 502, each rule has a rule identifier (ID) 506 and three components, though other numbers of components may be possible. The three components illustrated include a left-hand side (LHS) 508, a conversion factor (θ) 510, and a right-hand side (RHS) 512. The LHS and RHS are strings describing units and scales. For example, for rule r1, euro=1.3×USD, the LHS is euro, the conversion factor is 1.3, and the RHS is USD.

The same unit and scale can be referred to in several ways. For example, USD also can be referred to as $ and US Dollar; mil also can be referred to as min, million and millions. The techniques as described herein receive canonical strings for units and scales, in some instances with the assumption that there is a canonical string for every unit and scale. As illustrated in the set 502, the rules are specified using the canonical strings. Furthermore, the techniques as described herein receive synonyms so that the occurrence of synonyms can be detected in column headers and column values, in some instances with the assumption that all the synonyms are known by the constructs implementing the techniques. Synonyms can accommodate differences in notation, such as abbreviations (November=Nov.=11), scientific notation ($6.02e23=6.02\times10^{23}$), significant digits (3.14 vs. 3.14159265 . . . ), etc.

For simplicity, the described techniques assume if a rule a=θ×b is present, the reverse rule b=1/θ×a is also present in the rule database (not shown in FIG. 5 to avoid clutter). In addition, the techniques and constructs can handle ranges as the conversion factor in order to capture fluctuating conversion factors. For example, a rule might specify the conversion factor between euro and USD to be anywhere between 1.2 and 1.3. For simplicity, the description herein focuses on a single number as the conversion factor. In addition, the rules can change with time. For example, a system administrator, other user, or automatic control code, can insert new rules, delete existing rules or modify the LHS, conversion factor or RHS of existing rules.

FIG. 5 depicts example mutex groups 504(1), 504(2), and 504(3) corresponding to the set of eight rules depicted at 502, which can be used to perform SMA of attributes, including attributes represented by numeric values, which may be in different units or scales, and attributes represented by numeric values that can vary by time, according to some embodiments. In other embodiments some of the illustrated mutex groups may be omitted and/or other mutex groups may be added.

The techniques described herein can identify mutex groups 504 by constructing a graph with each label $l \in L$ as a node and inserting an edge between two nodes if there is a rule with the two strings as its LHS and RHS. The techniques determine the connected components of the graph so that each connected component corresponds to a mutex group.

Given a corpus of tables and a set of conversion rules, the techniques described herein facilitate building a semantic graph G over tables that enables SMA of attributes, including attributes represented by numeric values, which may be in different units or scales, and attributes represented by numeric values that can vary by time to perform accurate entity augmentation. When each table $T \in T$ represents a node in G, the semantic graph G can contain two types of edges, termed S edges and X edges, in addition to semantic labels.

As used herein, S edges refer to edges between two nodes T(K,B) and T(K',B') if and only if T.K and T.K' refer to the same type of entities and T.B and T.B' refer to the same attribute of those entities, expressed in the same unit and scale and reflect information of the same periods of time (e.g., same year, same quarter, etc.).

As used herein, X edges refer to edges between two nodes T(K,B) and T(K',B') if and only if T.K and T.K' refer to the same type of entities and T.B and T.B' refer to the same attribute of those entities, and reflect information of the same periods of time (e.g., same year, same quarter, etc.) but expressed in different units and/or scales. Each X edge is associated with a set of conversion rules which converts the values from T.B to T.B'. Since the reverse rule is present for each forward rule, for every X edge from T to T', there is an X edge with an equivalent set of rules from T' to T. Hence, directionality of X edges can be ignored in the discussion.

As used herein, a semantic label refers to a label for scale, unit, and/or time at each node. Techniques as described herein distinguish between the scale and unit labels (SU labels in short) and time labels. Generally a node will be assigned multiple SU labels and only one time label.

Figure 6:
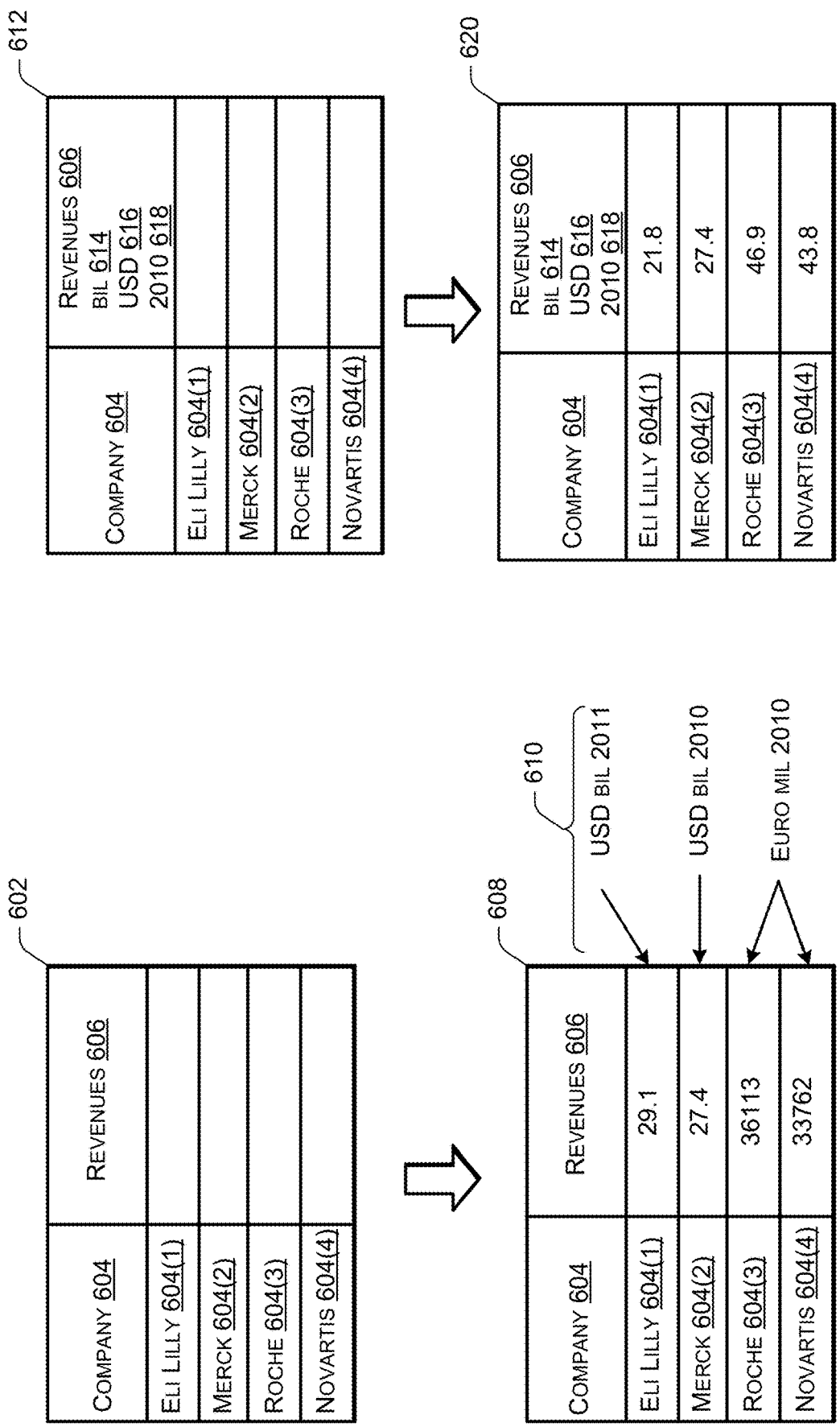
FIG. 6 illustrates example entity augmentation operations for attributes, according to an example scenario.

FIG. 6 illustrates entity augmentation operations for attributes, including attributes represented by numeric values, which may be in different units or scales, and attributes represented by numeric values that can vary by time, according to various embodiments.

Query table 602 is an example of an entity augmentation query for four entities 604 and one keyword 606 in a query table. In the illustrated example, the four entities are four pharmaceutical companies, Eli Lilly 604(1), Merck 604(2), Roche 604(3), and Novartis 604(4) with one keyword, revenues 606.

To support entity augmentation, a system employing a baseline approach finds tables that match with the query table 602. In this instance matching means that the tables contain at least one of the entities and an attribute whose name matches the keyword of the query. The baseline system then consolidates the matching tables to fill in the desired values.

For the baseline approach to obtain high precision and recall, the matching tables must be semantically consistent. Matching the attribute names with the keywords using information retrieval (IR) techniques does not ensure this. For example, using the baseline approach, query 602 can match with tables containing 2010 revenues and tables containing 2011 revenues. Using the baseline approach, query 602 can also match with tables containing revenues in billions of USD, tables containing revenues in billions of Euros, tables containing revenues in millions of USD and tables containing revenues in millions of Euros (because all of these tables contain the keyword 'revenues'). Consolidating values from such different tables without understanding the semantic relationships between them can lead to erroneous augmentation as illustrated in result table 608. Absent markers 610, it may not be apparent that table 608 shows revenues for Eli Lilly in billions of US dollars for the year 2011, revenues for Merck in billions of US dollars for the year 2010, and revenues for Roche and Novartis in millions of Euros for the year 2010.

In contrast, query table 612 shows an example of an entity augmentation query using semantic matching and annotation of attributes, including attributes represented by numeric values, which may be in different units or scales, and attributes represented by numeric values that can vary by time, for the same four entities as query table 602, e.g., Eli Lilly 604(1), Merck 604(2), Roche 604(3), and Novartis 604(4) with the same keyword, revenues 606. Query table 612 also includes two numeric attributes, "bil" (i.e., billions) 614 and "USD" (i.e., United States Dollars) 616, and one time-varying attribute, "2010" representing the year 618.

To support entity augmentation, the techniques and constructs described herein find tables that match with the query table 612. In this instance matching means that the tables contain at least one of the entities and an attribute whose name matches the keyword of the query as well as tables with attributes, including attributes represented by numeric values, which may be in different units or scales, and attributes represented by numeric values that can vary by time, provided for by the conversion rules.

The SMA of attributes system as described herein then applies the conversion rules to attributes, including attributes represented by numeric values, which may be in different units or scales, and attributes represented by numeric values that can vary by time, from the matching tables and consolidates the matching tables to fill in the desired values.

For the techniques and constructs described herein to obtain high precision and recall, the matching tables need not be semantically consistent. Thus, unlike the query 602, the query 612 does not match with tables containing 2010 revenues as well as those containing 2011 revenues because there are not conversion rules between 2010 and 2011. However, the query 612 does match with tables containing 2010 revenues in billions of USD as well as tables containing 2010 revenues in millions of Euros since such tables contain the keyword revenues and the time attribute 2010. Applying the conversion rules to consolidate values from such different tables with an understanding the semantic relationships between them leads to appropriate augmentation as illustrated in result table 620, which represents an augmented table.

FIG. 7 depicts an example semantic graph 700 over five web tables $T_1$, $T_2$, $T_3$, $T_4$, $T_5$, according to at least one embodiment of SMA of attributes as described herein.

As a first example, the baseline technique can be used to identify the 3 edges shown by lines 702, 704, and 706. Edges 702, 704, and 706 can be referred to as simple (S) edges because they capture simple, 1:1 mappings, between $T_2$ and $T_3$, $T_1$ and $T_4$, and $T_4$ and $T_5$, respectively. Consider the query table Q 602 of FIG. 6; as described above, the baseline technique will match query table 602 with all five tables $T_1$, $T_2$, $T_3$, $T_4$, and $T_5$. The result of entity augmentation using the baseline approach is as shown in result table 608 of FIG. 6. For Eli Lilly, $T_4$ and $T_5$ provide the value 29.1 while $T_1$ provides 21.8. Hence, applying an aggregate score, the baseline approach selects 29.1 for presentation in results table 608 of FIG. 6. For Merck, $T_1$ provides 27.4, $T_5$ provides 45.9 and $T_2$ provides 21091; the baseline approach may select 27.4 for presentation in results table 608 of FIG. 6 based on a matching score. For Roche and Novartis, $T_3$ provides the values 36113 and 33762 respectively. The result is undesirable: the value for Eli Lilly is in USD billion and from 2011, the one for Merck is also in USD billion but from 2010 and the ones for Roche and Novartis are in Euro million and from 2010. The baseline approach produces semantically inconsistent results.

A number of the attributes in the example web tables $T_1$, $T_2$, $T_3$, $T_4$, and $T_5$ are numeric and the same semantic attribute occurs in a variety of units and scales across different of the example web tables. For example, in FIG. 7 $T_1$ shows 2010 revenue in billions of USD while $T_2$ and $T_3$ show 2010 revenue in millions of Euros. The baseline approach has no knowledge of unit and/or scale nor does the baseline approach have an ability to identify discrepancy in unit and/or scale. Thus, it is impossible for the baseline approach to produce semantically consistent results in this instance. In addition, many numeric attributes are time-varying in nature. Thus, different tables, which may have been created at different times, contain values of the same attribute for different periods of time. For example, $T_1$ shows the revenue information for 2010 while $T_4$ and $T_5$ show the same information for 2011. The baseline approach has no knowledge of time nor does the baseline approach have an ability to identify discrepancy in the time periods shown. Thus, again it is impossible for the baseline approach to produce semantically consistent results in this instance. Moreover, the baseline approach fails to detect relationships where the same semantic attribute is expressed in different units or scales. For example, the baseline approach fails to detect that $T_1$, $T_2$, and $T_3$ contain the same semantic attribute (2010 revenue) and thus the values could have been converted from one to the other. Without this knowledge, it is impossible for the baseline approach to convert the values in the matching tables into a matching scale and unit.

Techniques for SMA of attributes as described herein build a semantic graph over tables suited for numeric and time-varying attributes, including attributes represented by numeric values, which may be in different units or scales, and attributes represented by numeric values that can vary by time. As described herein, a semantic graph over tables suited for attributes, including attributes represented by numeric values, which may be in different units or scales, and attributes represented by numeric values that can vary by time, includes semantic labels and semantic matches.

Semantic labels annotate each attribute column with unit, scale, and a time period or timestamp. The examples provided show year as the timestamp for simplicity of explanation, but other time periods may be used. Techniques for SMA of attributes, including attributes represented by numeric values, which may be in different units or scales, and attributes represented by numeric values that can vary by time, as described herein can handle other granularities of timestamp like quarter, month, day, etc. The semantic labels are shown in boxes 708, 710, 712, 714, and 716 of FIG. 7.

Semantic matches: techniques for SMA of attributes, including attributes represented by numeric values, which may be in different units or scales, and attributes represented by numeric values that can vary by time as described herein determine semantic matches between columns representing the same semantic attribute, even if the attribute values are expressed in different units and/or scales. For example, in addition to the S edges 702, 704, and 706, the graph shows an edge between $T_1$ and $T_2$, 718, and between $T_1$ and $T_3$, 720, in FIG. 7.

The SMA of attributes techniques identify the two edges shown by lines 718 and 720. Edges 718 and 720 can be referred to as transformation or conversion (X) edges because they capture conversion between units and/or scale for mappings between $T_1$ and $T_2$ and $T_1$ and $T_3$, respectively.

Given a set of pre-defined conversion rules, such as those presented in FIG. 5, an X edge between a pair of tables T and T' can be associated with a set of conversion rules which when applied convert the values between T.B and T.B'. For example, as shown the X edge 718 between $T_1$ and $T_2$ and the X edge 720 between $T_1$ and $T_3$ are associated with two conversion rules. The first conversion rule is r1: Euro=1.3× USD, and the second conversion rule is r2: bil=1000×mil.

There are several technical challenges in building such a graph. First, identifying the semantic labels as well as the X edges is hard as the unit and scale information is often missing in the column headers or values. For example, table $T_3$ does not specify that the revenue information is in millions of Euros. Techniques and constructs for SMA of attributes leverage the wealth of tables on the web to infer this information and perform transformation or conversion as appropriate, including for attributes represented by numeric values, which may be in different units or scales, and attributes represented by numeric values that can vary by time. Even if the column header of table $T_3$ in this example does not contain the label information, semantically matching columns of other tables might contain the label information (in their column headers). The SMA of attributes system described herein can "propagate" those labels to table $T_3$. For example, $T_3$ semantically matches with table $T_2$; the techniques extract $T_2$'s labels mil and Euro locally, e.g., from $T_2$'s column header and column values. The system then propagates extract $T_2$'s labels mil and Euro to $T_3$. Although this example illustrates propagation over an S edge, this propagation also can occur over X edges.

Such propagation creates an interdependence between labels and semantic matches. The system employs semantic matches to compute the labels and the system employs the labels to compute the matches. In various embodiments, techniques for SMA of attributes, including attributes represented by numeric values, which may be in different units or scales, and attributes represented by numeric values that can vary by time, addresses the interdependence by representing the task as a probabilistic graphical model (e.g., a Markov random field) that simultaneously discovers labels and semantic matches over columns, in some instances, all columns. However, making such inferences can lead to inconsistencies, such as if the same table is assigned both Euro and USD as labels. In some embodiments, techniques for SMA of attributes, including attributes represented by numeric values, which may be in different units or scales, and attributes represented by numeric values that can vary by time, addresses such inconsistencies by defining hard constraints to control such inconsistent labels and integrating the hard constraints into the inference algorithm.

In addition, schema matching techniques can compute spurious matches. For example, spurious matches can result from the values of an attribute such as revenues not changing significantly from one year to another. In FIG. 7, the revenues of Pfizer and Abbott Labs did not change significantly from 2010 to 2011, which led to a spurious semantic match between $T_1$ and $T_4$, which leads to semantically inconsistent results as shown in a second example presented in the discussion below of FIG. 12. Techniques of SMA of attributes as described herein can leverage the discovered labels to eliminate such spurious edges. For example, these techniques can infer that the edge 704 between $T_1$ and $T_4$ is spurious based on the discovered labels 2010 and 2011 respectively. Hence edge 704 can be marked as spurious as illustrated by the cross-off 722 or omitted. In some embodiments, techniques and/or constructs of SMA of attributes, including attributes represented by numeric values, which may be in different units or scales, and attributes represented by numeric values that can vary by time, encode this knowledge as hard constraints into a graphical model.

In some embodiments, techniques as described herein are based on probabilistic graphical models to discover the semantic labels of columns and semantic matches between columns over a number of tables, in some instances all tables, collectively instead of individually. The graphical model described herein elegantly combines diverse signals such as "local" extraction of labels from the column headers and values, semantic matches computed using traditional schema matching techniques, and label propagation. Such techniques employ particular efficient algorithms to solve tasks of joint discovery.

In some embodiments, techniques and constructs as described herein provide for an entity augmentation API suited for attributes, including attributes represented by numeric values, which may be in different units or scales, and attributes represented by numeric values that can vary by time. Such an API allows input specifying unit, scale and time information to unambiguously specify the augmentation task. An example of using such an API and the desired output is shown in result table 620 of FIG. 6, which is based on the graph shown in FIG. 7. Such techniques employ particular query processing algorithms for the new entity augmentation operation.

Extensive experiments on three real-life datasets of web tables have shown that the graph produced by the graphical model of SMA of attributes, including attributes represented by numeric values, which may be in different units or scales, and attributes represented by numeric values that can vary by time, described herein has significantly higher quality in terms of semantic labels and semantic matches compared with the baseline approach. Furthermore, entity augmentation based on the above graph demonstrated significantly higher precision and recall compared with the baseline approach.

One option for semantic graph construction is to employ a "staged" approach. An example staged approach, includes a first stage of building a semantic graph as proposed in the baseline approach. The semantic graph acquired using the baseline approach will contain only S edges. The second stage includes adding semantic labels to the semantic graph acquired using the baseline approach. The third stage includes adding X edges to the semantic graph from the second stage. In various embodiments this option for semantic graph construction can be implemented as follows.

In order to add semantic labels to the semantic graph acquired using the baseline approach, the techniques described herein apply the following algorithm. Let L denote a set of scale and unit descriptor strings that appear in the LHSs and RHSs of the conversion rules.

Formally, $$\mathcal{L} = \bigcup_{r \in R} r \cdot LHS \cup \bigcup_{r \in R} r \cdot RHS$$

where R denotes the set of conversion rules and r.LHS (r.RHS) denotes the scale or unit descriptor included in the LHS (RHS) of rule r. Given the synonyms for each scale or unit descriptor $l \in L$, the system annotates a web table T with a label $l \in L$ if l or a synonym of l occurs in either the column header $H_T$ of T.B or column values of T.B. For example, the system annotates $T_1$ in FIG. 7 with {USD, bil} and $T_2$ with {Euro,mil}.

Let Y denote the set of year strings. In various embodiments the set of year strings includes all year strings from 1900 to 2050, though other time or year strings are possible. In some embodiments the system annotates a table T, such as a web table, with $y \in Y$ if the y occurs in either the column header $H_T$ of T.B or in the context $C_T$ of T For example, in FIG. 7, $T_1$ is annotated with 2010. When the labels are extracted locally from this table, the approach can be termed "local extractions."

To determine X edges, after adding the semantic annotations as described above, the techniques described herein can add an X edge between T and T' associated with the set $R \subseteq R$ of conversion rules if and only if (i) the set $L_T$ of labels of T contains LHS of each rule $r \in R$, i.e., $\cup r \in R$ r.LHS$\subseteq L_T$ (ii) the set $L'_T$ of labels of T' contains RHS of each rule $r \in R$, i.e., $\cup r \in R$ r.RHS $\subseteq L'_T$ and (iii) the values of the common entities in the two tables can be converted from one to the other by multiplying with the product of the conversion factors, i.e., $Sim_x(T, T',R) > \delta$ where $Sim_x(T, T',R)$ denotes the fraction of common entities that can be converted using the product of the conversion factors and $\delta$ is a threshold.

Formally, $$Sim_X(T, T, R) = \frac{\left|(t, t') \in T \times T' \text{ s.t. } t \cdot A = t' \cdot A \wedge \frac{t' \cdot B}{t \cdot B} \sim \prod_{r \in R} r \cdot \theta\right|}{|(t, t') \in T \times T' \text{ s.t. } t \cdot A = t' \cdot A|}$$

For example, the techniques described herein add an X edge between $T_1$ and $T_2$ corresponding to conversion rules R={USD=0.77×Euro, bil=1000×mil} because (i) $T_1$ has labels {USD, bil} (ii) $T_2$ has labels {Euro, mil} and (iii) the values of the common entities (i.e., Pfizer and Merck) satisfy the product of the conversion factors, i.e., 46277/60.1~ (0.77×1000) for Pfizer and 21091/27.4~(0.77×1000) for Merck. So, $Sim_x(T_1, T_2,R)=1.0$. Note that in some embodiments the techniques allow slight variations in values while checking the convertibilities. For example, the conversion ratio of USD to Euro does not have to be exactly 0.77; and may cover a range such as 0.769 to 0.772, etc.

The staged approach can suffer from problems of low precision and low coverage. Regarding low precision, text in the context fields and text in the column headers can be noisy and ambiguous, which can cause annotations based on only local extraction to lead to incorrect labels.

Regarding low coverage, often, unit, scale and year information is missing in the column headers, values and context. For example, $T_3$ from FIG. 7 does not contain this information. So, the staged approach can fail to annotate $T_3$ with the unit, scale and year information. Consequently, the staged approach fails to detect the two X edges (corresponding to conversion rules $R_1$ and $R_2$ listed in FIG. 3) between $T_1$ and $T_3$. The fact that many tables do not have column headers and/or context information exacerbates the low coverage problem.

Computing the labels using labels of semantically matching columns in addition to using local extractions improves the precision and coverage. Computing the labels using labels of semantically matching columns in addition to using local extractions creates an interdependence between labels and semantic matches. Techniques as described herein employ semantic matches to compute the labels and the techniques employ the labels to compute the matches. Techniques as described herein employ a global approach that collectively computes all the labels and matches and combines the diverse signals. In various embodiments techniques for SMA of attributes, including attributes represented by numeric values, which may be in different units or scales, and attributes represented by numeric values that can vary by time, addresses the interdependence by representing the task as a probabilistic graphical model (e.g., a Markov random field) that simultaneously discovers labels and semantic matches over columns, in some instances, all columns Techniques for SMA of attributes, including attributes represented by numeric values, which may be in different units or scales, and attributes represented by numeric values that can vary by time, as described herein use undirected graphical models, referred to as Markov networks or Markov random fields in various embodiments. A graphical model represents the joint distribution over a set of random variables $x=\{X_1, \ldots, X_n\}$ where each $X_i$ can take values from the space of labels. The model represents each element of x as a node in a graph G and captures the dependencies between them with a set of cliques of G. As used herein, a clique is a subset of the set of vertices of the graph G, such that every two vertices in the subset are connected by an edge, or in other words, the subgraph represented by the clique is complete.

Techniques for SMA of attributes, including attributes represented by numeric values, which may be in different units or scales, and attributes represented by numeric values that can vary by time, as described herein identify the cliques and define a potential function $\psi(C, X_C) \to R$ for each clique. $\psi(C, X_C)$ captures the compatibility of the labels $X_C$ assigned to the variable subset C. In various embodiments the techniques described herein use two kinds of potentials: node potentials $\psi(i, X_i)$ defined on the label $X_i$ of a single node i and edge potentials $\psi(i,j,X_i,X_j)$ defined over edge (i,j) in G and labels $(X_i,X_j)$ assigned to the two nodes edge (i,j) connects. In some embodiments the overall probability distribution is the normalized product of all of the potentials. In logarithmic representation, $$P(X_1, \ldots, X_n) \propto \exp\left(\sum_i \psi(i, X_i) + \sum_i \sum_j \psi(i, j, X_i, X_j)\right)$$

The inference problem is to find $\mathrm{argmax}_x P(X_1, \ldots, X_n)$, the most likely joint assignment of labels to variables. The following descriptions provides operations performed in various embodiments to model the semantic annotation and matching task as a graphical model by defining the random variables, node and edge potentials, the overall objective and finally the inference algorithm.

FIG. 8 depicts an example graphical model for matching and annotating attributes, including attributes represented by numeric values, which may be in different units or scales, and attributes represented by numeric values that can vary by time from three web tables $T_1$, $T_2$, and $T_3$, according to some embodiments.

As illustrated in FIG. 8, for every table T, the techniques associate two random variables: the first random variable $L_T$ to denote the set of SU labels and the second random variable $y_T$ to denote the time (year) label. There can be multiple SU labels assigned to T; hence, $L_T$ can take a value from the set P(L) where p(s) denotes the power set of any set s. Recall L denotes the set of scale and unit descriptor strings that appear in the LHSs and RHSs of the conversion rules. On the other hand, there can be at most one year label assigned to T; hence, $\gamma_T$ can take a value from the set Y ∪ {NA} (NA denotes no year). For every pair of tables T, T', the techniques described herein associate a random variable $B_{TT'}$ denoting the semantic match between T and T'. There can be either an X edge (represented by a set of one or more conversion rules) or an S edge or no edge at all; hence $B_{TT'}$ can take a value from the set $\{p(R)-\{\Phi\}\} \cup \{S, NA\}$. Recall R denotes the set of conversion rules.

In various embodiments, techniques for SMA of attributes, including attributes represented by numeric values, which may be in different units or scales, and attributes represented by numeric values that can vary by time as described herein define node and clique potentials to combine diverse signals like local extraction of labels from the column headers and values, semantic matches computed using traditional schema matching techniques, and label propagation.

One technique for assigning SU labels is the local extraction technique described in the staged approach, in which an SU label $l \in L$ is assigned to a table T, such as a web table, if and only if either l or one of its synonyms occur in either the column header $H_T$ of T.B or column values of T.B. In various embodiments techniques for SMA of attributes, including attributes represented by numeric values, which may be in different units or scales, and attributes represented by numeric values that can vary by time as described herein define two features for this purpose. The techniques define a binary feature function $f_H(T, l)$ which is set to 1 if $H_T$ contains either the label l or a synonym of l, and 0 otherwise. For column values, the techniques for SMA of attributes, including attributes represented by numeric values, which may be in different units or scales, and attributes represented by numeric values that can vary by time as described herein extract the strings that precede and follow the numeric values in column T.B. Let PFStrings(T) denote the set of strings that consistently precede or follow the values across the entire column (e.g., in more than 80% of the rows). For example, in FIG. 7, PFStrings($T_2$)={Euro}. The techniques described herein define a binary feature function $f_V(T, l)$ which is set to 1 if there exists a $s \in$ PFStrings(T) such that s either contains l or a synonym of l, and 0 otherwise. A set LT of labels is a valid assignment if either $f_H(T, l)$ or $f_V(T, l)$ is 1 for all or most labels in it. Aspect 802 of FIG. 8 illustrates an example node potential $\psi_{su}$.

The techniques described herein define a node potential $\psi_{su}(T, L_T)$ as follows:

$$\psi_{su}(T, L_T) = \frac{\sum_{l \in L_T} \max(f_H(T, l), f_V(T, l))}{|L_T|}$$

SU labeling, especially with label propagation, can lead to inconsistencies. For example, the same table might be assigned both Euro and USD as labels. In various embodiments, techniques for SMA of attributes, including attributes represented by numeric values, which may be in different units or scales, and attributes represented by numeric values that can vary by time as described herein define hard constraints to control such inconsistent labels and integrate them into node potential $\psi_{su}(T, L_T)$. The techniques described herein define a set of mutually exclusive groups (referred to as "mutex groups") such that any table can be assigned at most one label from a mutex group. Two strings l and l' are in the same mutex group if l is connected to l' via a chain of one or more conversion rules $l=\theta_1 \times p_1$, $p_1=\theta_2 \times p_2, \ldots, p_{n-1}=\theta_n \times l'$. Suppose the system has the eight conversion rules 502 of FIG. 5, the mutex groups for the eight rules are shown at 504 of FIG. 5. In various embodiments, SMA of attributes, including attributes represented by numeric values, which may be in different units or scales, and attributes represented by numeric values that can vary by time techniques as described herein can compute the mutex groups by constructing a graph with each label $l \in L$ as a node and inserting an edge between two nodes if there is a rule with the two strings of labels as the LHS and RHS of the rule. The techniques as described herein can compute all the connected components of the graph when each connected component corresponds to a mutex group by applying a mutex function. Let Mutex(l, l') denote a binary variable which is true if there exists a mutex group containing both l and l' and false otherwise. The techniques described herein can modify $\psi_{su}(T, L_T)$ to disallow inconsistent labeling by recognizing large negative values as representing inconsistent labels.

The final node potential $\psi_{su}(T, L_T)$ can be formally represented as follows.

$$\psi_{su}(T, L_T) = -\infty \text{ if } l, l' \in L_T \text{ s.t. Mutex}(l, l') \text{ is true}$$

$$= \frac{\sum_{l \in L_T} \max(f_H(T, l), f_V(T, l))}{|L_T|} \text{ otherwise}$$

One technique for determining S edges is the schema matching technique described in the baseline approach in which there is likely to be an S edge between two web tables T and T' if the common entities in the two tables have equal values in the attribute column. In various embodiments techniques for SMA of attributes, including attributes represented by numeric values, which may be in different units or scales, and attributes represented by numeric values that can vary by time as described herein define tuple similarity $Sim_s(T, T')$ as the fraction of common entities that have approximately equal values as follows.

$$Sim_S(T, T') = \frac{|(t, t') \in T \times T' \text{ s.t. } t \cdot A = t' \cdot A \wedge t \cdot B \sim t' \cdot B|}{|(t, t') \in T \times T' \text{ s.t. } t \cdot A = t' \cdot A|}$$

The described techniques allow slight variations in values while checking the equalities. S is a good assignment for $B_{TT'}$ if $Sim_s(T, T')$ is above a certain threshold, for example, δ.

For X edges, in various embodiments the techniques follow the computation technique described in the staged approach, which means there is likely to be an X edge associated with a set R ∈ R of conversion rules between T and T' if (i) labels of T contain the LHSs of R, (ii) labels of T' contain the RHSs of R, and (iii) the values of the common entities can be converted using the product of the conversion factors. In various embodiments, $Sim_X(T, T', R)$ can denote the fraction of common entities that can be converted using the product of the conversion factors. An X edge associated with set of rules R represents a good assignment if (i) and (ii) are true and $Sim_X(T, T', R)$ is above a certain threshold, for example, δ. Aspect 804 of FIG. 8 illustrates an example clique potential $\psi_e$.

In various embodiments the techniques described herein define the final clique potential $\psi_e(T, T', L_T, L'_T, B_{TT'})$ as follows:

$$\psi_e(T, T', L_T, L'_T, B_{TT'}) = Sim_S(T, T') \text{ if } Sim_S(T, T') > \delta \wedge B_{TT'} = S$$

$$= Sim_X(T, T', R) \text{ if } Sim_X(T, T', R) > \delta \wedge B_{TT'}$$

$$= R \wedge \bigcup_{r \in R} r \cdot LHS \subseteq L_T \wedge \bigcup_{r \in R} r \cdot RHS \subseteq L'_T$$

$$= 0 \text{ otherwise}$$

As with SU labels, local extraction can be an important clue in assigning time labels such as year labels. In various embodiments, SMA of attributes, including attributes represented by numeric values, which may be in different units or scales, and attributes represented by numeric values that can vary by time, techniques as described herein assign a year label $y \in Y$ to T if the y occurs either in the column header $H_T$ of $T_B$ or in the context $C_T$ of T. The techniques as described herein can define two binary feature functions: (i) $f_H(T, y)$, which is set to 1 if $H_T$ contains y and to 0 otherwise, and (ii) $f_C(T, y)$ which is set to 1 if $C_T$ contains y and to 0 otherwise. $y_T$ is a good assignment if either $f_H(T, y_T)$ or $f_C(T, y_T)$ is 1. Aspect 806 of FIG. 8 illustrates an example time potential $\psi_y$.

The techniques as described herein can define the node potential $\psi_y(T, y_T)$ as follows:

$$\psi_y(T, yT) = \max(f_H(T, yT), f_C(T, yT))$$

In various embodiments of SMA of attributes, including attributes represented by numeric values, which may be in different units or scales, and attributes represented by numeric values that can vary by time, techniques as described herein, if there is an S edge between T and T', by definition, the techniques described herein can propagate all the labels $l \in L_T$ of T to T', and vice-versa. For example, FIG. 7 illustrates an example of labels so propagated (mil and Euro) from $T_2$ to $T_3$. $L_T$ and $L'_T$ represent valid assignments to two tables T and T' connected by an S edge if all of their elements are the same, the number of their elements that are the same exceeds a threshold, or most of their elements are the same, e.g., the set similarity (such as Jaccard Similarity) is high.

In various embodiments of SMA of attributes, including attributes represented by numeric values, which may be in different units or scales, and attributes represented by numeric values that can vary by time techniques as described herein, if there is an X edge (associated with a set R of rules) from T to T', the techniques described herein can propagate all labels $l \in (L_T - \cup r \in R \text{ r.LHS})$ from T to T' and all labels $l \in (L_T - \cup r \in R \text{ r.RHS})$ from T' to T''. The techniques described herein leverage that T and T' are semantically identical except in the scales and units present in the rules connecting them. Thus, all labels of T can be applied to T' and vice-versa. For example, with two tables T and T', when T has labels $L_T$={mil, USD} and there is an X edge associated with the rule USD=0.77×Euro from T to T' techniques as described herein can propagate the label {mil, USD}−{USD}={mil} from T to T'. $L_T$ and $L'_T$ represent valid assignments to two tables T and T' connected by an X edge associated with the set of rules R if all or most of the elements in $L_T - \cup r \in R$ r.LHS and $L'_T - \cup r \in R$ r.RHS are the same or if the number of their elements that are the same exceeds a threshold, in other words, when the set similarity (e.g., Jaccard Similarity) between those two sets is high. Aspect 808 of FIG. 8 illustrates an example label edge potential $\psi_{l_p}$.

The techniques as described herein can define the label edge potential $\psi_{l_p}(T, T', L_T, L'_T, B_{TT'})$ as follows:

$$\psi_{l_p}(T, T', L_T, L'_T, B_{TT'}) = JaccSim(L_T, L'_T) \text{ if } B_{TT'} = S$$

$$= JaccSim\left(L_T - \bigcup_{r \in R} r \cdot LHS, \right.$$

$$\left. L'_T - \bigcup_{r \in R} r \cdot RHS\right) \text{ if } B_{TT'} = R$$

$$= 0 \text{ otherwise}$$

The techniques as described herein can propagate the time, e.g., year, label from T to T' if there is either an S edge or X edge between them. $y_T$ and $y'_T$ represent valid assignments to two tables T and T' connected by an S or X edge if $y_T=y'_T\neq NA$. Aspect 810 of FIG. 8 illustrates an example time edge potential $\psi_{lp}$.

The techniques as described herein can define the time edge potential $\psi_{lp}(T, T', y_T, y'_T, B_{TT'})$ as follows:

$$\psi_{lp}(T, T', y_T, y'_T, B_{TT'}) = 1 \text{ if } y_T$$
$$= y'_T \wedge y_T$$
$$\neq NA$$
$$= 0 \text{ otherwise}$$

Schema matching techniques can introduce spurious edges. Time-varying attributes can be significant source of such errors. For example, if the values of an attribute (e.g., revenues) did not change significantly from one year to another, a spurious match can be returned. In FIG. 7, the revenues of Pfizer and Abbott Labs did not change significantly from 2010 to 2011, which leads to a spurious semantic match 722 between $T_1$ and $T_4$. In various embodiments, techniques for SMA of attributes, including attributes represented by numeric values, which may be in different units or scales, and attributes represented by numeric values that can vary by time as described herein disallow such spurious matches by recognizing large negative values as representing year labels that are not identical. Aspect 812 of FIG. 8 illustrates an example edge constraint clique potential $\psi_{ec}$.

The techniques as described herein can define the edge constraint clique potential $\psi_{ec}(T, T', y_T, y'_T, B_{TT'})$ as follows:

$$\psi_{ec}(T, T', y_T, y'_T, B_{TT'}) = -\infty \text{ if } y_T \neq y'_T \wedge y_T$$
$$\neq NA \wedge y'_T$$
$$\neq NA \wedge B_{TT'} \neq NA$$
$$= 0 \text{ otherwise}$$

In various embodiments, techniques for SMA of attributes, including attributes represented by numeric values, which may be in different units or scales, and attributes represented by numeric values that can vary by time, as described herein accomplish a goal of finding assignment to the variables $L_T$, $y_T$, and $B_{TT'}$ such that the following objective is maximized:

$$\sum_T \psi_{su}(T, L_T) + \sum_T \psi_y(T, y_T)(\text{local extraction}) + \qquad (1)$$
$$\sum_{T,T'\in T} \psi_e(T, T', L_T, L'_T, B_{TT'})(S \text{ and } X \text{ edges}) +$$
$$\sum_{T,T'\in T} \psi_{lp}(T, T', L_T, B_{TT'}) (SU \text{ label propagation}) +$$
$$\sum_{T,T'\in T} \psi_{lp}(T, T', y_T, y'_T, B_{TT'}) (\text{year label propagation}) +$$
$$\sum_{T,T'\in T} \psi_{ec}(T, T', y_T, y'_T, B_{TT'}) (\text{edge constraint})$$

FIG. 9 depicts an example algorithm for independent inference in pseudo code, according to various embodiments.

In various embodiments, techniques for SMA of attributes, including attributes represented by numeric values, which may be in different units or scales, and attributes represented by numeric values that can vary by time, first show how to find the optimal node and edge labeling to maximize the objective described above in the case of no label propagation. This optimization can be solved in polynomial time because the optimization for each objective component can be solved completely based on local information, which is similar to the staged approach described before. Pseudo code of Algorithm 1 is shown in FIG. 9.

At 902, local extraction of unit, scale and year is first performed based on feature functions defined above. Once the node labels have been determined, at 904, S and X edges are computed using the similarity function and the computation technique described above. The edge labels can then be obtained accordingly. At 906, the techniques for SMA of attributes, including attributes represented by numeric values, which may be in different units or scales, and attributes represented by numeric values that can vary by time, as described herein change the edge label to NA for those having different years on two sides to satisfy the edge constraint $\psi_{ec}$.

Figure 10:
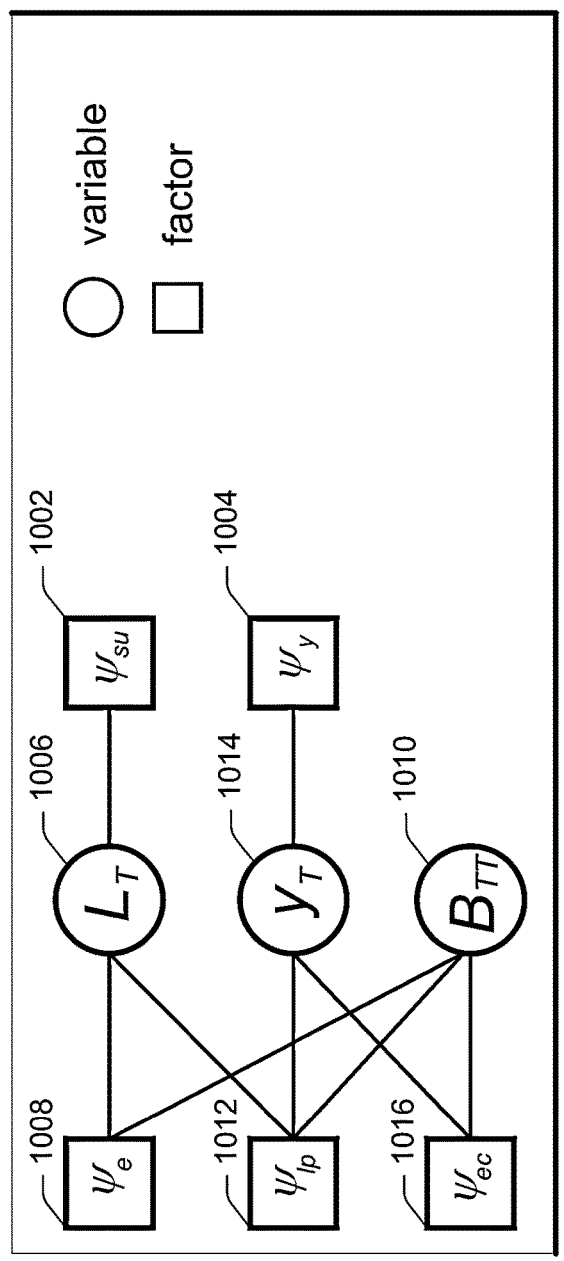
FIG. 10 depicts an example semantic graph employed in SMA of attributes, according to some embodiments.

FIG. 10 depicts an example semantic graph 1000, according to some embodiments of SMA of attributes, including attributes represented by numeric values, which may be in different units or scales, and attributes represented by numeric values that can vary by time.

Techniques for SMA of attributes, including attributes represented by numeric values, which may be in different units or scales, and attributes represented by numeric values that can vary by time, apply an approximation algorithm to resolve the collective inference by adapting the techniques proposed in probabilistic graphical model. At least one embodiment employs a belief propagation algorithm as described in "Probabilistic Graphical Models: Principles and Techniques," D. Koller and N. Friedman. *MIT Press*, 2009, which is incorporated by reference herein. A belief propagation algorithm operates on a factor graph which contains variable nodes and factor nodes, and proceeds by passing "belief" via messages between variable nodes and factor nodes. In the problem described for FIG. 7 and FIG. 8, there are three variables and five factors. FIG. 10 illustrates a corresponding factor graph. There is an edge between a variable x and a factor $\psi$ if and only if x appears in $\psi$. The algorithm can start with initializing the node potential $\psi_{su}$ at 1002 and the node potential $\psi_y$ at 1004 for each table T by doing the local extraction of scale, unit and year labels. The collective inference is then processed by iteratively passing messages between neighboring nodes. At each iteration, techniques for SMA of attributes, including attributes represented by numeric values, which may be in different units or scales, and attributes represented by numeric values that can vary by time, as described herein schedule the message passing process in three steps. The first step is centered on edge potential $\psi_e$. The messages are sent from the scale/unit label $L_T$ 1006 to $\psi_e$ 1008, then to the edge label $B_{TT'}$ 1010 and then sent back. This step tries to create more edges between tables based on current belief of node labeling and, at the same time, tries to select labels that are beneficial for edge creation. At the second step, the focus is on the edge potential $\psi_{lp}$ 1012 for label propagation. The messages are passed from $L_T$ 1006, $y_T$ 1014, and $B_{TT'}$ 1010 to $\psi_{lp}$ 1012; $\psi_{lp}$ 1012 then sends back messages according to the set of labels that produce the highest potential. The final step deals with the constraint $\psi_{ec}$ 1016 for eliminating spurious edges. The passing schedule for this step is similar to Step 1 except that the messages are sent between year label $y_T$ 1014, edge label $B_{TT'}$ 1010, and $\psi_{ec}$ 1016. The processing stops when the message values converge or the number of iteration reaches the threshold set for a maximum limit. The final values of variables are derived from the messages. Details of an algorithm for collective inference are presented in pseudo code in FIG. 11.

Figure 11:
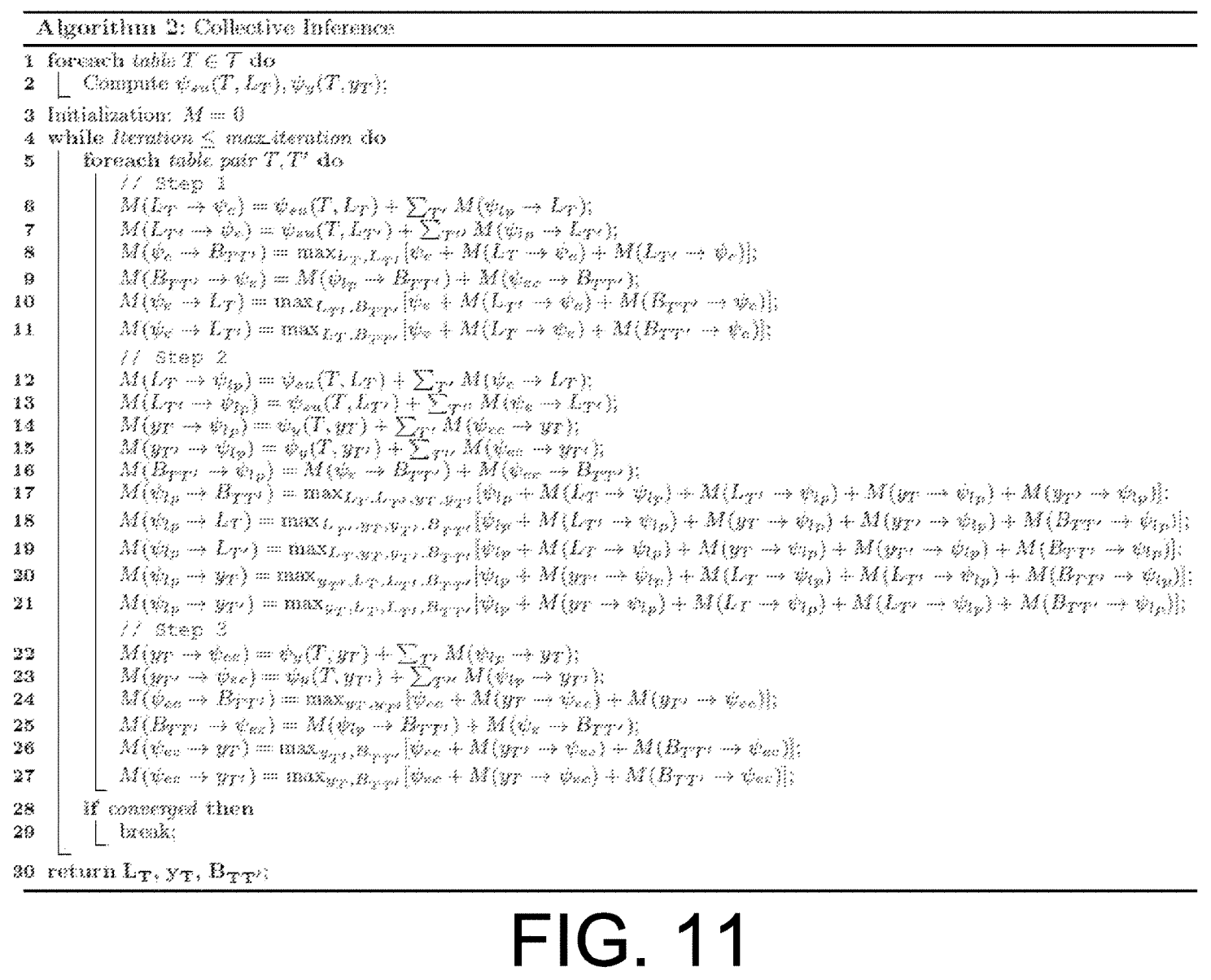

FIG. 11 depicts an example algorithm for collective inference in pseudo code, according to at least one embodiment.

Finding labels that maximize the final objective function with label propagation is NP-Hard, even for a simple case with one variable $Y_T$.

In this simple case, the objective can be represented by the following:

$$\max_y \sum_{T \in \mathcal{T}} \psi_s(T, y_T) + \sum_{T,T' \in \mathcal{T}} \psi_{ec}(T, T', y_T, y'_T) + \sum_{T,T' \in \mathcal{T}} \psi_{tp}(T, T', y_T, y'_T) \quad (2)$$

Theorem 1. Finding optimal labeling for objective (2) is NP-Hard.

Proof. Reduction from a metric labeling problem can be employed as described in, "Approximation algorithms for classification problems with pairwise relationships: metric labeling and markov random fields," J. Kleinber and E. Tardos, *J. ACM*, 49(5): 616-639, September 2002, which is incorporated by reference herein. Metric labeling is defined over a weighted undirected graph G=(V, E) and a label set L, where the weight (nonnegative) w(v, v') indicates the strength of the relationship between node v and node v'.

Given: (1) a nonnegative cost function c(v, l) for assigning label l to the node v; (2) a distance d(l, l') between label l and l', the objective is to find a labeling function $f: V \rightarrow L$ such that the following total cost is minimized:

$$C(f) = \sum_{v \in V} c(v, f(v)) + \sum_{(v,v') \in E} w(v, v') \cdot d(f(v), f(v'))$$

To reduce the metric labeling for the example problem described herein, the techniques for SMA of attributes, including attributes represented by numeric values, which may be in different units or scales, and attributes represented by numeric values that can vary by time, let each node $v \in V$ corresponds to one $T \in \mathcal{T}$. The variable $y_T$ can only take labels from set L and cannot be NA. Then the techniques define node potential $\psi_y$, edge potential $\psi_{ec}$, and edge potential $\psi_{tp}$ as follows:

$\psi_y(v,l) = -c(v,l)$ $\psi_{ec}(v, v', l,l') = -w(v,v') \cdot d(l,l')$ $\psi_{tp}(v, v', l,l') = 0$ Since the cost c and distance d are both nonnegative, maximizing $\psi_y(v, l)$ is equivalent to minimizing the cost for assigning l to v. Similarly, maximizing $\psi_{ec}(v, v', l, l')$ is equivalent to minimizing the cost for assigning l and l' to a pair of nodes. The techniques let $\psi_{tp}$ be zero so that it does not affect the final labeling. Hence, the objective function (2) is consistent with the total cost in metric labeling. If a labeling function $f$ can be found in polynomial time to maximize the objective (2), the labeling function $f$ can also minimize the total cost C in the metric labeling problem.

There are hundreds of millions of tables on the web. Thus, to build a semantic graph over all web tables, a belief propagation algorithm will be able to scale to factor graphs containing billions of nodes. Since the belief propagation algorithm follows a computational model consistent with large-scale graph processing, the techniques can leverage large-scale graph processing technologies for scalable implementation of collective inference. For example, many large scale graph processing tasks can be expressed as a sequence of iterations, in each of which a vertex can receive messages sent in the previous iteration, send messages to other vertices, and modify its own state and that of its outgoing edges or mutate graph topology. Several systems have been developed for such a computation model over large-scale graphs. For example those described by "A system for large-scale graph processing," Maleqicz et al., *SIGMOD* '10, 2010, and "The trinity graph engine," Shao, et al., *SIGMOD* '13, 2013, are incorporated by reference herein.

FIG. 12 depicts an example algorithm for query processing in pseudo code, according to various embodiments. In various embodiments, techniques for SMA of attributes, including attributes represented by numeric values, which may be in different units or scales, and attributes represented by numeric values that can vary by time, as described herein can support entity augmentation queries and/or other types of table search queries, such as web table search queries.

Definition 1 (Query Interface). An entity augmentation query Q=(A, E, SU, Y) includes of four components:
A: keywords describing attribute name.
E: set of entities of interest.
SU: unit and scale (optional).
Y: timestamp (optional).

The API of SMA of attributes, including attributes represented by numeric values, which may be in different units or scales, and attributes represented by numeric values that can vary by time, significantly extends the previous entity augmentation API which takes only attribute name and entity set as input described in "Infogather: entity augmentation and attribute discovery by holistic matching with web tables," Yakout, et al., *SIGMOND* '12, 2012. Techniques for SMA of attributes, including attributes represented by numeric values, which may be in different units or scales, and attributes represented by numeric values that can vary by time, as described herein extend the query language with SU and Y to unambiguously specify the augmentation task. Furthermore, the techniques for SMA of attributes, including attributes represented by numeric values, which may be in different units or scales, and attributes represented by numeric values that can vary by time, as described herein better leverage the semantic graph built as described herein.

Steps for entity augmentation queries were described in the description of FIG. 4. The description also introduced indexes built for efficient query time processing. FIG. 12 represents an example algorithm providing details for query processing in pseudo code, according to various embodiments.

At 1202, techniques as described herein identify matching tables. Given a query Q, the techniques leverage the EI index from data store 414 of FIG. 4 to identify the set of tables that contains at least one of the entities in Q.E. Among these tables, the techniques use the NLI index from data store 414 of FIG. 4 to identify the subset of tables that satisfy the following conditions: (1) The column header matches with the attribute name keywords in Q.A; (2) The year label matches with the query label in Q.Y (if any); (3) The unit and scale labels match with each of the query labels in Q.SU. A unit/scale label is considered a match if it occurs in the same mutex group as Q.SU. Because the unit/scale label and Q.SU are convertible from one to another, the techniques can convert values from the units in which the values are available to the desired query unit. The techniques search for semantically matching tables for each qualified table using GI index from data store 414 of FIG. 4. The qualified tables together with their matching tables become the sources for filling in values at 1204.

At 1204, techniques as described herein fill-in values. For each table identified at 1202, the techniques collect the values provided in the table for each of the query entities. The techniques compare the semantic labels (unit and scale) of the table with the query labels. If these labels do not agree, the techniques convert the values to the desired unit and scale. The techniques aggregate the converted values. At 1206, the techniques augment the query entities with the values with the highest aggregate score.

As a second example, consider the web tables shown in FIG. 7. Suppose the collective inference approach has discovered the semantic labels and edges shown in FIG. 7. Consider the entity augmentation query shown in 612 of FIG. 6. The query processing algorithm will identify $T_1$, $T_2$, and $T_3$ as matching tables because (1) their column headers contain "revenues" (2) their year labels match with 2010, and (3) they contain unit/scale labels that are in the same mutex group as USD (USD, Euro and Euro respectively). For Eli Lilly, $T_1$ provides 21.8 which is already in USD bil. For Merck, $T_1$ provides 27.4 and $T_2$ provides 21091; the latter is converted to USD bil which also results in 27.4. For Roche and Novartis, $T_3$ provides the values 36113 and 33762 respectively; they are converted to USD bil resulting in 46.9 and 43.8 respectively. This produces the desirable, semantically consistent results, all from 2010 and all in billions of U.S. Dollars as shown in table 620 of FIG. 6.

Illustrative Results

As introduced above, experiments employing the techniques described herein on real-life datasets show that (i) a semantic graph created as described herein contains higher quality labels and semantic matches, and (ii) entity augmentation based on a graph so created has significantly higher precision and recall compared to conventional approaches. Some such experiments sought company revenue and profit data, data on the population of cities, and data on the total area of countries. Table 1 shows statistics of the datasets employed in some example experiments including the number of web tables, the total number of numeric attributes across all the tables and the average number of numeric attributes per table.

TABLE 1

| Domain | Tables | Numeric Attributes | Average |
|---|---|---|---|
| Company | 39,223 | 80,149 | 2.04 |
| City | 81,977 | 140,459 | 1.71 |
| Country | 159,730 | 344,509 | 2.16 |

The experiments also employed a database containing synonyms of unit and scale descriptors. Table 2 shows conversion rules relevant to the entity augmentation queries regarding company revenue and profit data, data on the population of cities, and data on the total area of countries, showing unit and scale while, for simplicity, omitting conversion factors involved in the rules.

TABLE 2

| Query Attribute | Conversion Tokens |
|---|---|
| Company revenue/profit | Euro USD billion million thousand NA |
| City population | billion million thousand NA |
| Country area | sq. meter sq. feet sq. km sq. mile |

The experiments included selecting a random set of 1000 EAB tables with attributes related to company revenue. Compare the labels on these tables discovered by the collective inference (CI) approach described above with the ones discovered by the independent inference (II) approach. Table 3 shows the quality results of the node labels. Recall that II computes labels based on local extractions only and X edges based on those labels. For SU labels (scale and unit), compared with II, CI discovers labels for 35% more nodes with high precision (~97%). II annotates 510 out of 1000 tables; CI annotates 180 more tables (due to label propagation).

In an analysis of the new tables annotated by CI approach, a manual check of labels from a random sample of 100 of 180 tables found 97 tables labeled correctly and completely and 3 tables (all in <million, usd>) partially correct. Further analysis of the 3 partially correct tables revealed that CI annotated two of them with million only and one with usd only. Manual confirmation of the original web page found that the two tables contained revenue values of year 1955. Since the majority of web tables contained recent information and values of year 1955 were very different from the ones of recent years, the two tables were not connected to the majority of tables in the semantic graph. Hence, CI did not propagate the correct unit to those two tables. The other error occurred on a table that contained information about revenue per employee instead of total revenue.

In an analysis of the labels discovered by both II and CI, 428 out of 510 labels are found to be identical. CI annotated 81 of the 510 tables with additional labels (e.g., usd →<usd, million>). In addition, CI made a correction to one of the tables because the table header specified million, whereas the values were in billions.

For year labels, CI labeled four times more nodes than II, with ~89% precision. II annotated 129 out of 1000 tables while CI annotated 527 tables. In an analysis of the tables annotated by CI approach, a manual check of year annotation from a random sample of 100 tables found the accuracy is 89%. From a careful analysis of the data, the mistakes made on the 11% of tables that were not accurate were mostly attributed to the similar values between different years. For example, an examination of a table for the year 2006 and a table for the year 2011 revealed 6 out of 8 entities in the 2006 table having values very close to 2011 revenue values.

Similar to the SU label, the SMA approach can also make correction to year labels. Analysis of the annotation results revealed a 2011 revenue table had "2010 revenue" in the header—the SMA approach correctly assigned the label 2011 to that revenue table. Table 3 presents information regarding node quality in the experiment.

TABLE 3

| | | | |
|---|---|---|---|
| SU | II | 510 | same: 428 |
| | CI | 690 | diff: 1 |
| | | | more: 81 (100%) |
| | | | new: 180 (~97%) |
| Year | II | 129 | same: 127 |

TABLE 3-continued

| | | |
|---|---|---|
| CI | 527 | diff: 2<br>more: —<br>new: 398 (~89%) |

An analysis of the quality of the semantic matches (i.e., edges) produced by techniques for SMA of attributes as described herein on the Company dataset considered the edges between the 1000 revenue tables. Recall that the CI and II approaches create new X edges and eliminate spurious edges (between tables that contain information from different years). For X edge creation, II creates 205 edges while CI creates 405. For spurious edge elimination, II removes only 4 edges while CI eliminates 336 edges (out of 1935 S edges). Both are due to label propagation: more labels lead to more X edge creation and more spurious edge elimination. To evaluate the accuracy of the edges created and eliminated, 100 random sample edges were taken from each of the sets and manual checked. The accuracy of CI was found to be 83% and 79% for created and eliminated edges respectively. Further analysis of the data revealed that the mistakes are again caused by the same (or similar) values shared by tables from different years. Table 4 shows the edge quality results, the number of X edges created and spurious edges eliminated by II and CI approaches, and the accuracy results for the Company dataset.

TABLE 4

| | X Edge | | Elimination | |
|---|---|---|---|---|
| | II | CI | II | CI |
| Number | 205 | 405 | 4 | 336 |
| Accuracy | ~90% | ~83% | 100% | ~79% |

FIG. 13 shows a number of examples of results from real-life experiments. Charts 1302 show the coverage and precision results of augmenting country area in square km. The x-axis represents different entity sets: the top-k countries in descending order of the country area for various values of k to study the sensitivity of the approaches to head and tail entities. The study assumed the countries with larger area would be head countries and the ones with smaller area would be tail countries. There may be some correlation between area and query popularity, but in general, there is no correlation; hence, the sensitivity aspect of this study was not conclusive. All the four approaches achieve high coverage; the coverage decreases as more tail entities are encountered. However, S and S-Syn approaches have poor precision: the highest being 0.22 on 250 countries. In contrast, II and CI achieve consistently high precision across all entity sets: an average precision of 0.87 for II approach and 0.93 for CI. This confirms that adding X edges and semantic labels significantly impacts the quality of entity augmentation queries. The improvement is more significant in CI more X edges and labels are created via label propagation.

Charts 1304 show the coverage and precision results of augmenting country area using a different unit, square feet. A drawback of the baseline approaches is more obvious with this query. The baseline approaches fail to augment even a single entity because country area is not available in the desired unit; hence, S and S-Syn finds zero relevant tables. On the other hand, II and CI approaches achieve high coverage and precision as II and CI can convert the values from the units they are available in to the desired unit.

Charts 1306 show the coverage and precision results of augmenting country tax rate for year 2006-2009. The baseline approaches reach high coverage for each of the query years. However, the average precision is only 0.55 and 0.54 for S and S-Syn respectively due to spurious edges between tables that contain information from different years; hence, the results contain values from years different from the query year. The II and CI improve the average precision to 0.72 and 0.92 respectively by eliminating spurious edges. Note that II returned no result for the year 2009 because II did not recognize the tables that contain the query answer without propagating the years. Overall, CI significantly outperforms II and the baselines as it does a better job in propagating the labels and eliminating spurious edges (as shown in Table 4).

A set of experiments compared the approaches for scenarios with the query including unit/scale and year. Charts 1308, 1310, 1312, and 1314 illustrate results for four entity augmentation queries on Company and City datasets. For this set of experiments, the charts omit illustration of the S approach because S either returned no results or similar results as S-Syn.

Charts 1308 show the coverage and precision results of 3 approaches, S-Syn, II, and CI, for the company-revenue query in <million, $> for year 2011. The baseline approach had good coverage but suffered from poor precision (~0.4). II did not improve the precision significantly but CI improved the precision to 0.9, which indicates that the higher quality labels and edges produced by CI significantly improved the quality of entity augmentation queries.

Charts 1310 show the coverage and precision results of the S-Syn, II, and CI approaches for the company-revenue query in <billion, $> for year 2011. Similar to augmenting country area in square feet 1304, the baseline approach returned no results, whereas II and CI were not affected by changing of query scale from million to billion. This is due to information not being available in <billion, $> and II and CI having the ability to convert the values from the units they are available into <billion, $>. The II and CI approaches achieved high coverage and precision since II and CI can convert the values from the units they are available in to the desired unit.

Charts 1312 show the coverage and precision results of the S-Syn, II, and CI approaches for the company-profit query in <million, $> for year 2011. The CI approach consistently outperforms both the II approach and the baseline approach.

Charts 1314 show the coverage and precision results of the S-Syn, II, and CI approaches for the city-population in million for year 2011. Again, CI significantly outperforms both the II approach and the baseline approach on precision and achieves high coverage as well. As shown, in the experiment the average coverage and precision were 0.9 and 0.9 respectively.

Conclusion

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) 106, 120, 200, and/or 300 such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain embodiments include, while other embodiments do not include, certain features, elements and/or steps. Thus, such conditional language is not generally intended to imply that certain features, elements and/or steps are in any way required for one or more embodiments or that one or more embodiments necessarily include logic for deciding, with or without user input or prompting, whether certain features, elements and/or steps are included or are to be performed in any particular embodiment. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   one or more processing units; and
   memory storing instructions that when executed by the one or more processing units, configure the one or more processing units to perform operations comprising:
   receiving an entity augmentation query including: an entity identifier, a keyword, at least one of a first unit identifier or a first scale identifier, and a time identifier;
   acquiring data from a plurality of tables in response to receiving the entity augmentation query, wherein respective tables of the plurality of tables have a column header containing the keyword;
   identifying at least one existing semantic label comprising the first unit identifier or the first scale identifier and the time identifier of at least a first of the plurality of tables from the data;
   identifying from the data that a second of the plurality of tables includes the entity identifier and the keyword and lacks at least one of the first unit identifier, the first scale identifier, or the time identifier;
   inferring a second semantic label for the second of the plurality of tables by semantically matching a portion of the data corresponding to the second of the plurality of tables to a portion of the data corresponding to the first of the plurality of tables and the at least one existing first semantic label;
   identifying at least one conversion rule associated with the at least one existing first semantic label;
   converting the data acquired from the plurality of tables, based at least in part on the query, the inferred second semantic label, and the at least one conversion rule to identify that the second of the plurality of tables includes the entity identifier and the keyword and lacks at least one of the first unit identifier, the first scale identifier, or the time identifier; and
   generating a revised table for display based on the converted data, the revised table having the inferred second semantic label;
   outputting, for display, a result to the entity augmentation query, the result output as the revised table containing the converted data including data from the second of the plurality of tables, in consistent units, scale, and time for the entity identifier.

2. The system as claim 1 recites, further comprising:
   building a semantic graph over at least the first table and the second table, the semantic graph suited for attributes, including attributes represented by numeric values, the semantic graph including:
   the at least one existing semantic label; and
   a semantic match; and
   exposing results from the semantic match meeting the query, including results acquired via the semantic graph.

3. The system as claim 2 recites, wherein the semantic label represents at least one of unit, scale, or time at individual nodes of the graph.

4. The system as claim 2 recites, wherein a node of the semantic graph is assigned at least one scale label, at least one unit label, and a time label.

5. One or more computer-readable storage media having computer executable instructions recorded thereon, the computer-executable instructions, upon execution, to configure a computing device to perform semantic matching and annotation of numeric attribute operations comprising:
   receiving an entity augmentation query including a name of an entity, a keyword associated with the entity, time information associated with the keyword, and at least one of first unit identifier associated with the keyword or first scale identifier associated with the keyword;
   obtaining data from a plurality of tables at least partially in response to the entity augmentation query, the data of a first table of the plurality of tables lacking one or more of a unit identifier, a scale identifier, or a year identifier, wherein respective tables of the plurality of tables have a column header containing the keyword;

identifying at least one existing semantic label of a second table of the plurality of tables, wherein the at least one existing semantic label of the second table includes the one or more of the first unit identifier, the first scale identifier, or the year identifier lacking from the data of the first table, wherein a conversion rule is associated with the at least one existing semantic label;

inferring a new semantic label corresponding to the at least one existing semantic label for one of the first unit identifier, the first scale identifier, or the year identifier at least in part by semantically matching a first portion of data of the first table with a second portion of data of the second table;

processing the entity augmentation query based at least in part on existing conversion rules or graphs including the conversion rule, the inferred semantic label, and the semantic match or an inference of the first unit identifier, the first scale identifier, or the year identifier to generate results including converted data from the data of the first table, the converted data generated by using the conversion rule to apply a conversion factor to the data of the first table; and generating a revised table for display based on the converted data, the revised table having the inferred semantic label;

exposing the results for the entity augmentation query, by outputting the results for display, the results output as the revised table containing the inferred semantic label.

6. The one or more computer-readable storage media as claim 5 recites, the operations further comprising exposing the entity augmentation query to indexes built on a plurality of tables.

7. The one or more computer-readable storage media as claim 6 recites, the operations further comprising exposing results from a probabilistic graphical model to model discovery of labels and the discovery of matches.

8. The one or more computer-readable storage media as claim 7 recites, wherein the exposing the results includes presenting the results from the probabilistic graphical model in a table format.

9. The one or more computer-readable storage media as claim 5 recites, wherein the exposing the results includes exposing the results to a spreadsheet program.

10. The one or more computer-readable storage media as claim 5 recites, wherein the exposing the results includes presenting the results in a table format.

* * * * *